United States Patent
Eddy

(10) Patent No.: US 11,952,956 B2
(45) Date of Patent: Apr. 9, 2024

(54) AUTOMATIC AIRCRAFT POWERPLANT CONTROL

(71) Applicant: Textron Aviation Inc., Wichita, KS (US)

(72) Inventor: Stephen M. Eddy, Derby, KS (US)

(73) Assignee: Textron Innovations Inc., Providence, RI (US)

( * ) Notice: Subject to any disclaimer, the term of this patent is extended or adjusted under 35 U.S.C. 154(b) by 32 days.

(21) Appl. No.: 17/749,659

(22) Filed: May 20, 2022

(65) Prior Publication Data

US 2022/0411088 A1 Dec. 29, 2022

Related U.S. Application Data

(60) Provisional application No. 63/191,101, filed on May 20, 2021.

(51) Int. Cl.
| | |
|---|---|
| *F02D 9/02* | (2006.01) |
| *B64C 11/30* | (2006.01) |
| *B64C 11/44* | (2006.01) |
| *B64D 31/04* | (2006.01) |
| *F02D 11/04* | (2006.01) |
| *F02D 29/02* | (2006.01) |

(52) U.S. Cl.
CPC ............ *F02D 9/02* (2013.01); *B64C 11/30* (2013.01); *B64C 11/305* (2013.01); *B64C 11/44* (2013.01); *B64D 31/04* (2013.01); *F02D 11/04* (2013.01); *F02D 29/02* (2013.01); *F02D 2009/021* (2013.01); *F02D 2009/0213* (2013.01); *F02D 2009/0277* (2013.01)

(58) Field of Classification Search
CPC . F02D 9/02; F02D 11/04; F02D 29/02; F02D 2009/021; F02D 2009/0213; F02D 2009/0277; B64C 11/303; B64C 11/305; B64C 11/44; B64D 31/04; B64D 31/14
See application file for complete search history.

(56) References Cited

U.S. PATENT DOCUMENTS

| | | | | |
|---|---|---|---|---|
| 2,727,578 | A * | 12/1955 | Alexanderson | ......... F02D 29/00 123/363 |
| 2,796,136 | A * | 6/1957 | Mock | .................... B64C 11/305 416/29 |
| 3,876,329 | A * | 4/1975 | Miller | ..................... F02D 29/02 416/29 |
| 5,931,637 | A * | 8/1999 | Wheeler | .................. B63H 3/06 416/165 |

(Continued)

*Primary Examiner* — Phutthiwat Wongwian
*Assistant Examiner* — Sherman D Manley
(74) *Attorney, Agent, or Firm* — Avek IP, LLC

(57) ABSTRACT

An automatic aircraft powerplant control system includes a throttle servo for adjusting a throttle valve via a throttle control linkage. A throttle control lever provides a user input to the throttle servo, and a throttle controller controls the throttle servo for controlling a throttle valve. A propeller servo is provided for adjusting a propeller governor setting of an engine. A propeller control lever provides a user input to the propeller servo, and a propeller controller controls the propeller servo. A mixture control servo is configured for providing a mixture control output to the engine via a mixture control linkage for adjusting an air-fuel mixture. A mixture controller is configured for controlling the mixture control servo.

19 Claims, 20 Drawing Sheets

(56) References Cited

U.S. PATENT DOCUMENTS

| | | | |
|---|---|---|---|
| 6,171,055 B1 * | 1/2001 | Vos | F02C 9/58 |
| | | | 416/37 |
| 6,379,114 B1 * | 4/2002 | Schott | B63H 3/10 |
| | | | 416/30 |
| 6,883,752 B2 | 4/2005 | Koch et al. | |
| 8,433,449 B2 | 4/2013 | Vos et al. | |
| 9,506,405 B2 | 11/2016 | Vos | |
| 10,604,268 B2 | 3/2020 | Lisio et al. | |
| 10,753,335 B2 | 8/2020 | Hunt | |
| 11,085,391 B2 * | 8/2021 | Hunter | F02D 41/0225 |
| 2006/0214054 A1 | 9/2006 | Fuerlinger et al. | |
| 2008/0027620 A1 | 1/2008 | Feuerlinger et al. | |
| 2017/0017257 A1 | 1/2017 | Sparks | |
| 2018/0297691 A1 * | 10/2018 | Eddy | B64C 13/503 |
| 2020/0247552 A1 | 8/2020 | Lisio et al. | |
| 2022/0372921 A1 | 11/2022 | Eddy | |
| 2022/0372922 A1 | 11/2022 | Eddy | |

* cited by examiner

AUTOMATIC AIRCRAFT POWERPLANT CONTROL

CROSS-REFERENCE TO RELATED APPLICATIONS

This application claims the benefit of U.S. Provisional Application No. 63/191,101 entitled "Single Lever Power Control For Piston Aircraft" and filed on May 20, 2021, which is herein incorporated by reference in its entirety.

BACKGROUND OF THE INVENTION

1. Field

The disclosed embodiments relate generally to the field of engine controls. More specifically, the embodiments relate to single power-lever control in piston aircraft.

2. Description of the Related Art

Many types of aircraft powerplant control are known. For example, U.S. Pat. No. 10,604,268 to Lisio et al. discloses auto throttle control for turbo-prop engines including a single lever power throttle to control the engine and the propeller. U.S. Pat. No. 9,506,405 to Vos discloses a single lever power controller for a power generation system, with a processor that may include a full authority digital electronic control (FADEC) engine. U.S. Pat. No. 11,085,391 to Hunter et al. discloses a throttle quadrant arrangement that uses a single throttle lever connected to three rotary-variable-differential transformers (RVDTs), which provide throttle lever commands to a FADEC controller that determines the correct fuel flow and power levels for the turbine engine, and pitch control for the propeller. U.S. Patent Application Publication No. 2017/0017257 to Sparks discloses a single lever power control system for use with variable pitch propeller aircraft, which uses an H-shaped plate configured for the lever to move in a flight mode and a feather mode.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In an embodiment, an automatic aircraft powerplant control system includes a throttle control configuration for controlling a throttle. The throttle control configuration includes a throttle servo mechanically coupled with an engine via a throttle control linkage. The throttle servo is configured for adjusting a throttle valve via the throttle control linkage. A throttle control lever is communicatively coupled with the throttle servo for providing a user input to the throttle servo. A throttle controller is communicatively coupled with the throttle servo for controlling the throttle servo. A propeller control configuration is provided for controlling a propeller. The propeller control configuration includes a propeller servo mechanically coupled with the engine via a propeller control linkage. The propeller servo is configured for adjusting a propeller governor setting of the engine. A propeller control lever is communicatively coupled with the propeller servo for providing a user input to the propeller servo. A propeller controller is communicatively coupled with the propeller servo for controlling the propeller servo. A mixture control configuration is provided for controlling an air-fuel mixture. The mixture control configuration includes a mixture control servo mechanically coupled with the engine via a mixture control linkage. The mixture control servo is configured for providing a mixture control output to the engine via the mixture control linkage for adjusting the air-fuel mixture. A mixture controller is communicatively coupled with the mixture control servo for controlling the mixture control servo.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
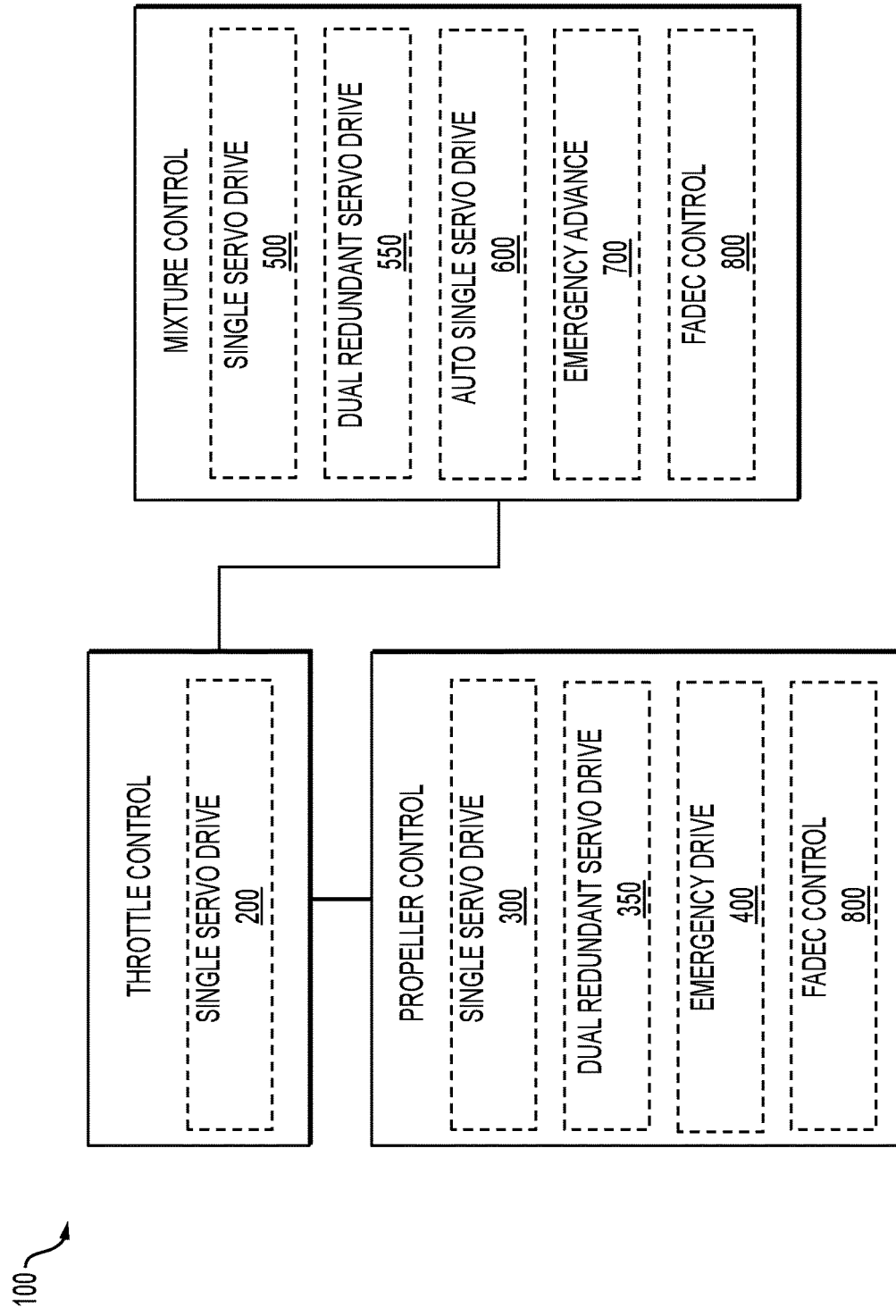
FIG. 1 is a block diagram illustrating different optional components for an automatic aircraft powerplant control system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments described herein provide automatic control of systems related to aircraft power generation. For example, embodiments provide automatic control of a throttle quadrant. The automatic control system is configured to provide automated control of three thrust-related aircraft functions: 1) engine power, 2) propeller speed and pitch, and 3) mixture of fuel and air (i.e., the "fuel-air mixture"). In some embodiments, automatic control is provided that enables the use of a single power lever with a controller to operate more than one of these three thrust-related aircraft functions. For example, embodiments described herein provide a throttle control system that enable a pilot to control the speed and thrust of a piston aircraft via a single power lever. In embodiments, a hybrid electro-mechanical mixing assembly is provided that enables a single, full-time-use power lever to provide control outputs to the engine for power, propeller speed and pitch, and fuel-air mixture. Secondary levers may be retained with the power lever in some embodiments to provide back-up control in the event of a failure or malfunction with the control system.

Advantages of the automated engine controls or single power lever include reduced pilot workload and simplified aircraft management. Conventional systems that provide a throttle control function, such as a three-servo control system, are large, complex, heavy, and expensive, making them practical only for larger aircraft such as turboprop aircraft. Embodiments described herein provide simpler and smaller systems compared to conventional throttle control systems, which makes feasible their use in piston aircraft. However, the systems disclosed herein could be used in other types of aircraft without departing from the scope hereof.

FIG. 1 is a block diagram illustrating exemplary arrangements for an automatic aircraft powerplant control system 100 for piston aircraft. Automatic aircraft powerplant control system 100 includes a throttle, which is a power throttle configured to provide control of an engine throttle valve based on a position of the pilot's power control lever. The engine throttle valve controls the amount of fuel-air mixture to the engine. In embodiments, the throttle is configured as a throttle control that includes a single servo capable of back driving an existing throttle control lever for controlling the throttle valve. Control of the propeller speed and pitch, as well as the mixture of fuel and air, may in some embodiments be coupled with throttle control, or independently controllable in other embodiments, as further described below. Different variations of automatic aircraft powerplant control system 100 may be accomplished with mechanical or hybrid electro-mechanical linkages, as further described below in connection with the drawing figures.

Throttle Control

Figure 2:
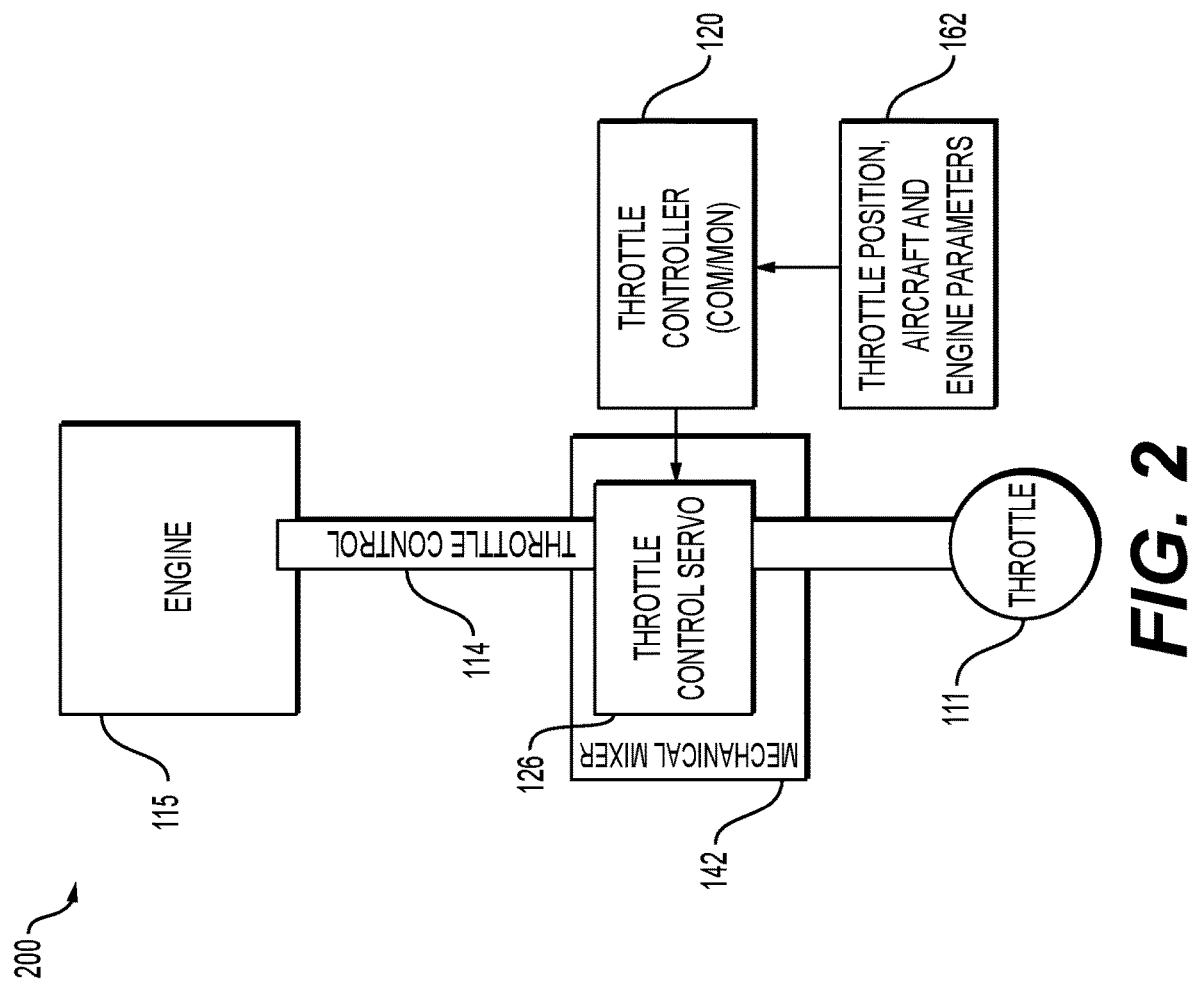
FIG. 2 is a schematic diagram showing a throttle-control configuration, in an embodiment.

FIG. 2 is a schematic diagram showing an exemplary throttle-control configuration 200 having a single servo drive. A throttle control linkage 114 provides a mechanical linkage between a power control lever 111, a throttle control servo 126, and an engine 115. Throttle control linkage 114 is for example a push-pull cable, a pushrod, a linkage, or some combination of these. Engine 115 is for example a piston-type engine. Linkage 114 provides a direct mechanical coupling such that throttle control servo 126 can back drive power control lever 111, and power control lever 111 can manually override throttle control servo 126.

A throttle controller 120 is configured to control throttle control servo 126. For example, throttle controller 120 may be embodied as a control board having one or more of a printed circuit board (PCB), a computer, a microcontroller, a microprocessor, or a programmable logic controller (PLC), having a memory, including a non-transitory medium for storing software/firmware, and a processor for executing instructions of the software/firmware. Throttle controller 120 includes control (COM) and monitoring (MON) channels to and from throttle control servo 126 and an avionics bus 162 of the aircraft. Throttle controller 120 is configured for controlling throttle control servo 126 based on inputs from avionics bus 162. Inputs include but are not limited to a throttle position, various aircraft and engine parameters (e.g., cylinder-head temperature, exhaust gas temperatures, altitude, airspeed, outside air temperature, manifold pressure, propeller speed).

A mechanical mixer 142 is configured for mixing the throttle servo 126 input to the mechanical input from the power control lever 111 to engine 115. In the embodiments disclosed herein, mechanical mixer 142 may be remote located anywhere between the propellor control lever 113 and engine 115 and either forward or aft of a firewall, which provides flexibility for determining where to locate mechanical mixer 142, and allows for rigging to be accomplished on a bench prior to installation rather than onboard the aircraft. For example, mechanical mixer 142 does not need to be installed at the throttle lever, but may instead be in the engine compartment or mounted externally to the engine.

Propeller Control

Propeller control is used to adjust a propeller governor setting of the aircraft's engine, which maintains a desired propeller speed in rotations-per-minute (RPM) (e.g., 2400-RPM, 2500-RPM, 2600-RPM, etc.) across variable power settings.

Figure 3:
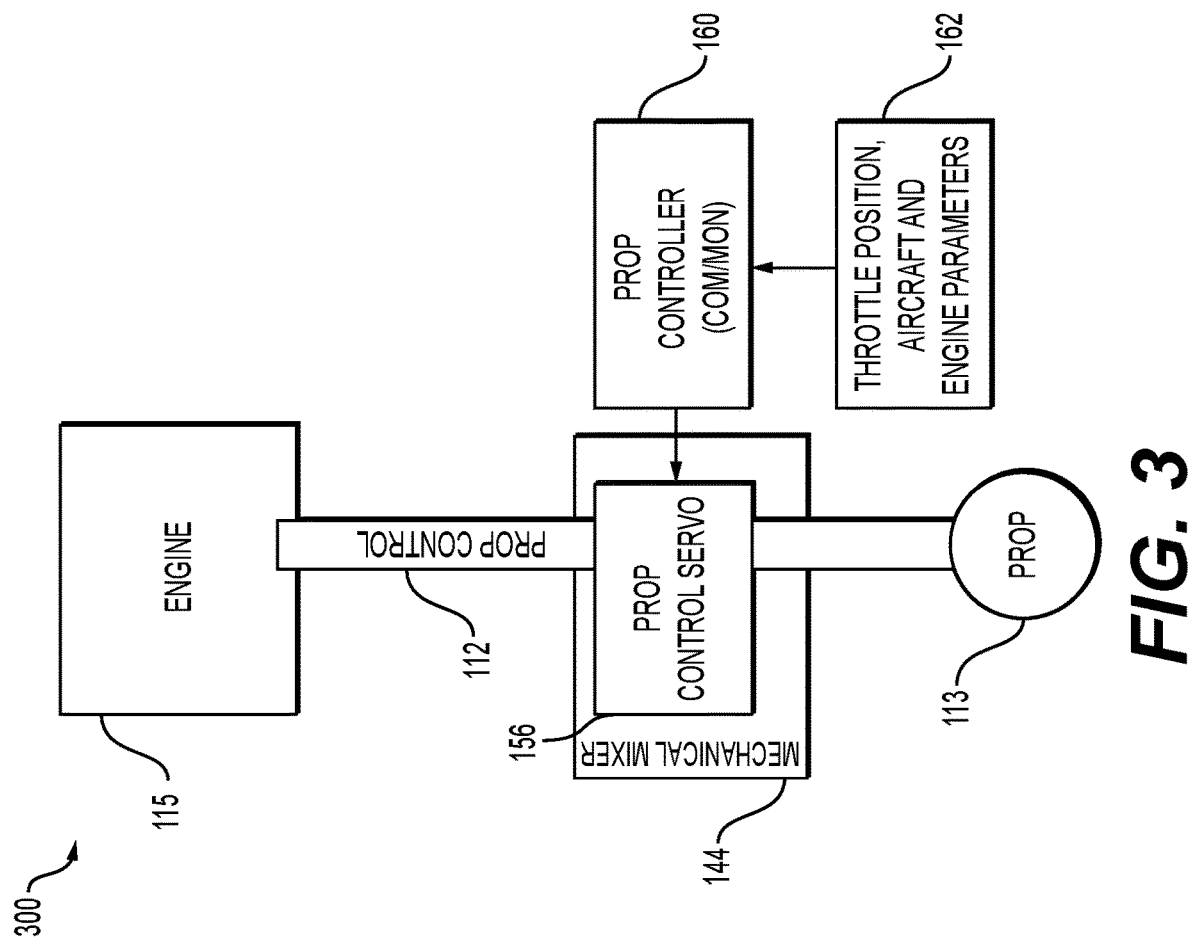
FIG. 3 is a schematic diagram showing a propeller-control configuration, in an embodiment.

FIG. 3 is a schematic diagram showing a single-servo propeller drive 300 coupled with electronic control for controlling propeller speed. Items enumerated with like numerals in the various figures are the same or similar and their description may not be repeated accordingly.

As depicted in FIG. 3, a propeller lever 113 is configured to accept user input for propeller control. A propeller-control servo 156 is used to provide control of the propeller governor via propeller-control cable 112. A propeller controller 160 is configured to provide electronic control of propeller-control servo 156. Propeller-control cable 112 mechanically couples propeller-control servo 156 to engine 115 for changing the propeller governor setting, which is used to change the propeller pitch, and thus the propeller speed for a given power output from engine 115. In other words, propeller-control servo 156 is used to provide control of the propeller governor via propeller-control cable 112.

Propeller controller 160 may be embodied as a control board having one or more of a printed circuit board (PCB), a computer, a microcontroller, a microprocessor, or a programmable logic controller (PLC), having a memory, including a non-transitory medium for storing software/firmware, and a processor for executing instructions of the software/firmware.

The controllers described herein, including propeller controller 160, are not limited by the materials from which they are formed or the processing mechanisms employed therein and, as such, may be implemented via semiconductor(s) and/or transistors (e.g., electronic integrated circuits (ICs)), and so forth. It should also be appreciated that the discussed functions and methods performed by the controllers described herein may be performed by other processors (e.g., within a flight computer).

Propeller controller 160 includes control (COM) and monitoring (MON) channels to and from propeller-control servo 156 and avionics bus 162 of the aircraft. Inputs from avionics bus 162 to propeller controller 160 include but are not limited to a throttle position, an RPM command to set a propeller speed or a range of propeller speeds, as well as various aircraft parameters and various engine parameters (e.g., aircraft attitude, airspeed, manifold pressure, cylinder-head temperature, and engine exhaust gas temperature).

A mechanical mixer 144 is configured for mixing the propeller servo 156 input to the mechanical input from the propeller control lever 113 to engine 115. In the embodiments disclosed herein, mechanical mixer 144 may be remote located anywhere between the propellor control lever 113 and engine 115 and either forward or aft of a firewall, which provides flexibility for determining where to locate mechanical mixer 144, and allows for rigging to be accomplished on a bench prior to installation rather than onboard the aircraft. For example, mechanical mixer 144 does not need to be installed at the propellor governor, but may instead be in the engine compartment or mounted externally to the engine.

Figure 4:
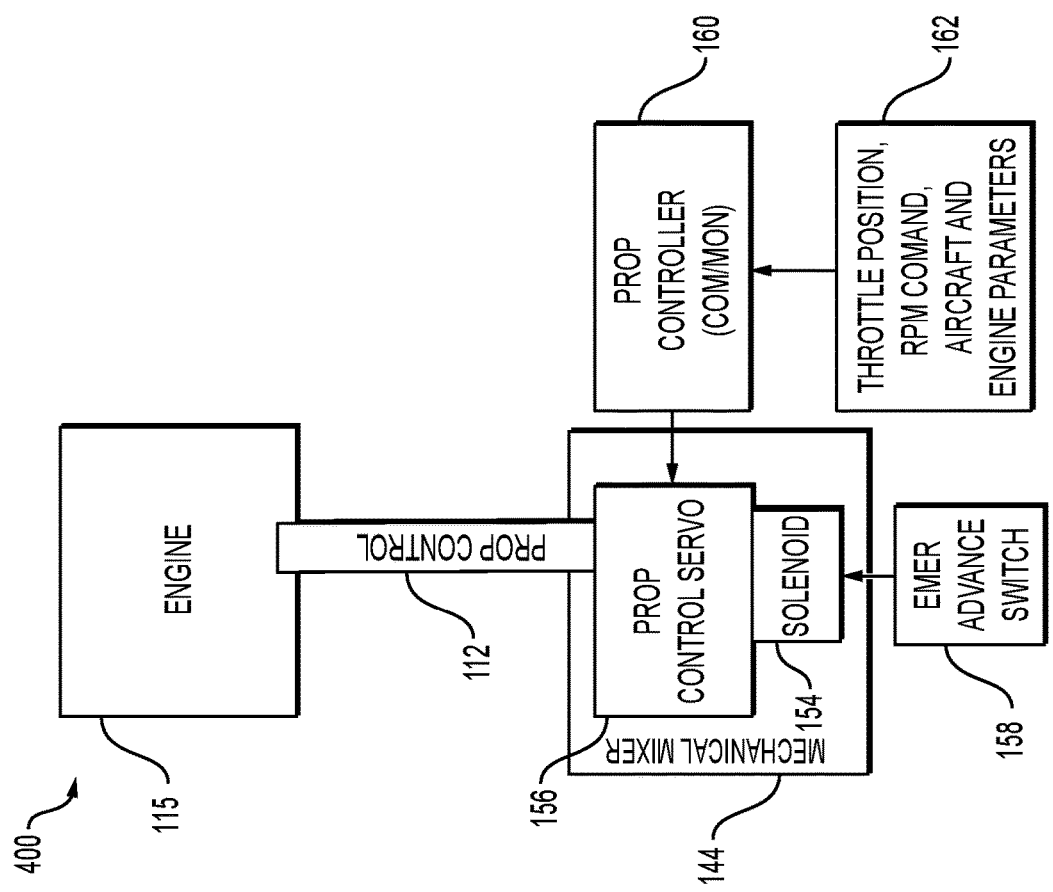
FIG. 4 is a schematic diagram showing another embodiment of a propeller-control configuration.

FIG. 4 is a schematic diagram showing a single-servo propeller drive 400 coupled with electronic control for controlling propeller speed and having a back-up electro-mechanical advance. The back-up electromechanical advance has no mechanical link to the throttle lever. Instead, it utilizes a propeller RPM solenoid 154 that is configured to force the propeller to a high-speed state (i.e., the high RPM state) via propeller-control cable 112. An emergency advance switch 158 is electronically coupled with propeller RPM solenoid 154, which enables the pilot to select the high RPM state of the propeller for the remainder of the flight. In embodiments, propeller RPM solenoid 154 may be used to change the mechanical scheduling of the propeller via propeller-control cable 112. Propeller RPM solenoid 154 may be activated by the pilot via a switch or rheostat, such as a propeller RPM switch located in the cockpit. The propeller RPM switch is communicatively coupled with propeller RPM solenoid 154 for receiving a pilot input, which enables the pilot to switch between low-speed (i.e., low RPM) setting and a high-speed (i.e., high RPM) setting for changing a speed of the propeller. The low RPM and high RPM propeller speed settings may each include a range of propeller speeds. Alternatively, an automated electronic control (e.g., from the aircraft's avionics system) may be used to automatically activate the RPM adjustment via propeller RPM solenoid 154 (e.g., during a cruise phase of flight to reduce propeller noise). In embodiments, propeller RPM solenoid 154 causes a fine adjustment of propeller governor control.

In another embodiment, a dual-redundant servo drive 350 with electronic control is provided for controlling propeller speed (see FIG. 1). With this option there is no mechanical link to the propellor control lever. In embodiments, a first propeller servo 191 and a second propeller servo 192 are configured to provide the dual-redundant servo drive 350 for propeller control of FIG. 1. In embodiments, a first mixture servo 193 and a second mixture servo 194 are configured to provide the dual-redundant drive 550 for mixture control of FIG. 1. Dual-redundant servo drive 350 and dual redundant servo drive 550 are further described below in connection with FIG. 11. Without departing from the scope hereof, dual-redundant servo drive 350 for propeller control may be provided without providing dual-redundant servo drive 550 for mixture control (not shown).

Mixture Control

Control of the correct ratio of fuel to air in the fuel-air mixture is important for proper operation of an aircraft engine. A "full rich" setting indicates the highest ratio of fuel to air for the lowest operating altitude of the aircraft (e.g., typically sea level). As the aircraft's altitude increases while climbing, the density of air decreases causing the fuel-to-air ratio to become richer. To compensate, the mixture is "leaned" via the mixture control, which decreases fuel flow to match the decreased air density at higher altitudes. Conversely, while the aircraft is descending from high altitude, the fuel-air mixture is enriched by increasing fuel flow via the mixture control. As described below in connection with FIGS. 5-8, at least four options may be employed to provide mixture control.

Figure 5:
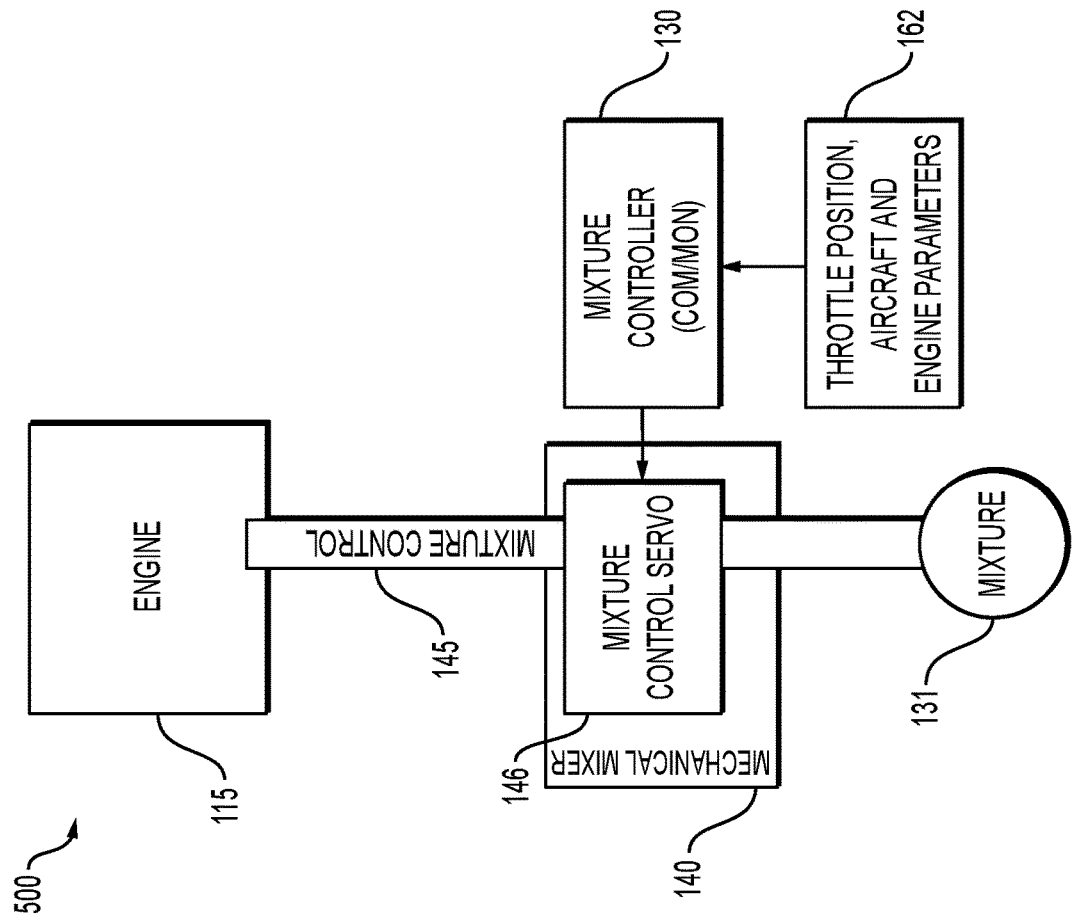
FIG. 5 is a schematic diagram showing another embodiment of a mixture-control configuration, in an embodiment.

FIG. 5 is a schematic diagram showing a single-servo mixture drive 500 coupled with electronic control for controlling the fuel-air mixture. Single-servo mixture drive 500 includes mixture control servo 146 within a mechanical mixer 140 (e.g., a mixing box). A mixture control output is provided to engine 115 for engine mixture control via a linkage 145, which is a mechanical linkage such as a push-pull cable or a pushrod. Mechanical mixer 140 is configured to mix input from the mixture control servo 146 with mechanical input from a mixture lever 131 to engine 115. In the embodiments disclosed herein, mechanical mixer 140 may be remote located anywhere between mixture lever 131 and engine 115 and either forward or aft of a firewall, which provides flexibility for determining where to locate mechanical mixer 140, and allows for rigging to be accomplished on a bench prior to installation rather than onboard the aircraft. For example, mechanical mixer 140 may be installed in the engine compartment or mounted externally to the engine.

In embodiments, mechanical mixer 140, mechanical mixer 142, and mechanical mixer 144 comprise the same or similar type of device configured to mechanically mix an input received from a servo (e.g., mixture control servo 146, throttle control servo 126, and propeller control servo 156, respectively) with an input received from a manual control lever (e.g., mixture lever 131, power control lever 111, and propeller control lever 113) to provide proper control at engine 115, including back-drive of each manual control lever when the respective servo is active.

Single-servo mixture drive 500 employs a mixture controller 130 to control mixture control servo 146 for implementing fully automated mixture control. Mixture controller 130 may be embodied as a control board having one or more of a printed circuit board (PCB), a computer, a microcontroller, a microprocessor, or a programmable logic controller (PLC), having a memory, including a non-transitory medium for storing software/firmware, and a processor for executing instructions of the software/firmware. Mixture controller 130 includes control (COM) and monitoring (MON) channels to and from mixture control servo 146 and an avionics bus 162 of the aircraft. Mixture controller 130 is configured for controlling mixture control servo 146 based on inputs from avionics bus 162. Inputs include but are not limited to a throttle position, various aircraft and engine parameters (e.g., cylinder-head temperature, exhaust gas temperatures, altitude, outside air temperature, manifold pressure, propeller speed). In certain embodiments, mixture controller 130 engages a boost solenoid based on barometric pressure and operating conditions of engine 115 provided via avionics bus 162. For example, this may be used to allow for a reduced mixture at maximum power for high altitude take-off and climb.

In certain embodiments, mixture control servo 146 comprises a back-drive capability that is configured to back drive an existing mixture control lever onboard the aircraft. Optionally, the back-driving capability may be disengaged to allow for pilot manual control via a mixture lever 131, in which linkage 145 provides a direct mechanical linkage with mixture lever 131. In the event of a failure or malfunction of mixture control, mixture lever 131 enables backup pilot mixture control and manual leaning of the fuel-air mixture via linkage 145. In case of a servo malfunction, the servo malfunction may be mechanically over-ridden by the pilot to advance the mixture to full rich.

Figure 6:
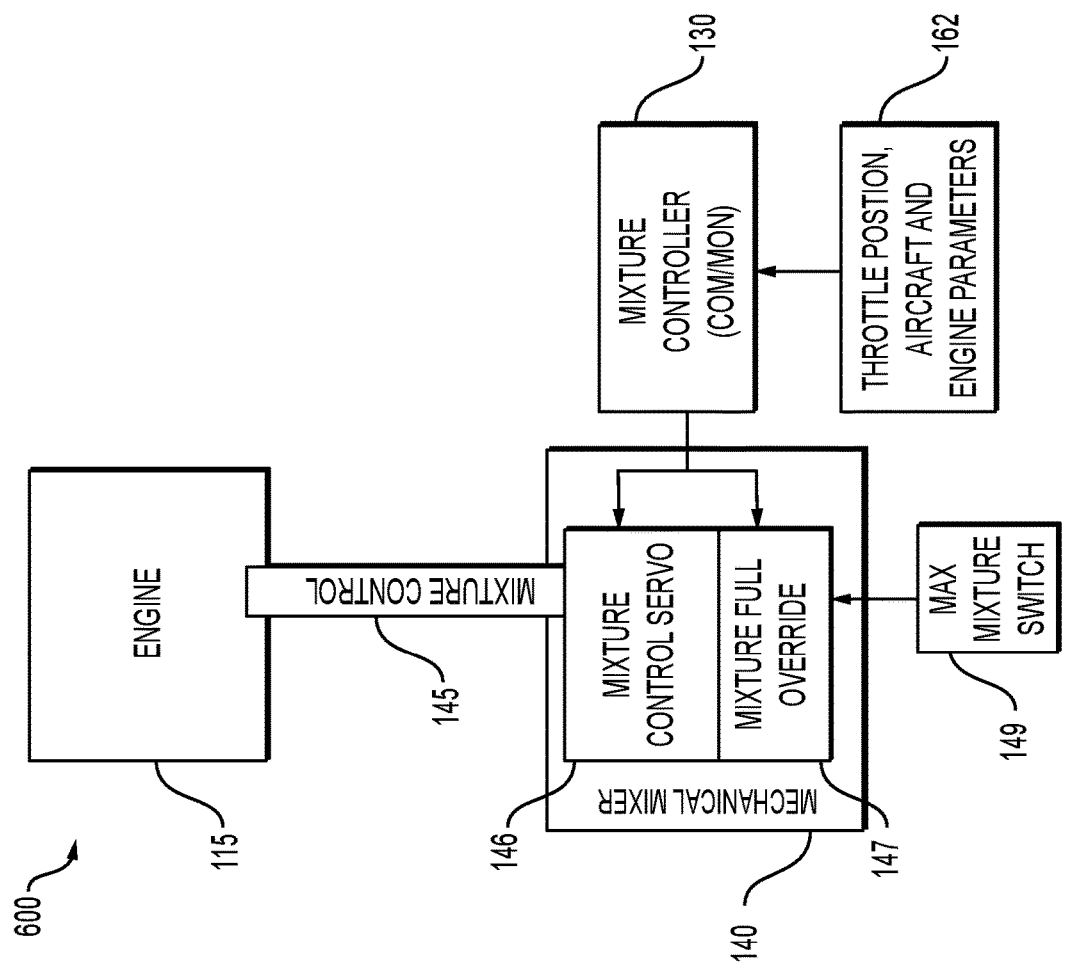
FIG. 6 is a schematic diagram showing another embodiment of a mixture-control configuration.

FIG. 6 is a schematic diagram showing an automated single-servo mixture drive 600 with a full-override option that is configured to provide a fully automatic fuel-air mixture to engine 115 via linkage 145 without the use of mixture lever 131. Automated single-servo mixture drive 600 includes electronic control via mixture controller 130 of mixture control servo 146 and a mixture full-override device 147. Mixture full-override device 147 is for example a servo or solenoid. Under normal operating conditions, mixture control servo 146 is configured for mixing fuel and air within mechanical mixer 140 as with single-servo mixture drive 500 of FIG. 5. However, a max-mixture switch 149 may be used by the pilot to activate mixture full-override device 147, which overrides mixture control servo 146 to provide a full-rich mixture to engine 115 for the remainder of the flight.

Override of a servo malfunction may be accomplished via one of the following options. Optionally, a button is provided that enables the pilot to select a "full rich" mode in which a solenoid is used to over-ride the single-servo mixture drive and force the mixture to a full rich position. This option may be performed using automated single-servo mixture drive 600 of FIG. 6, for example. In another option, a dual-redundant servo drive 550 (see FIG. 11) is provided, in which dual servo control is used with monitoring to ensure proper mixture control.

Figure 7:
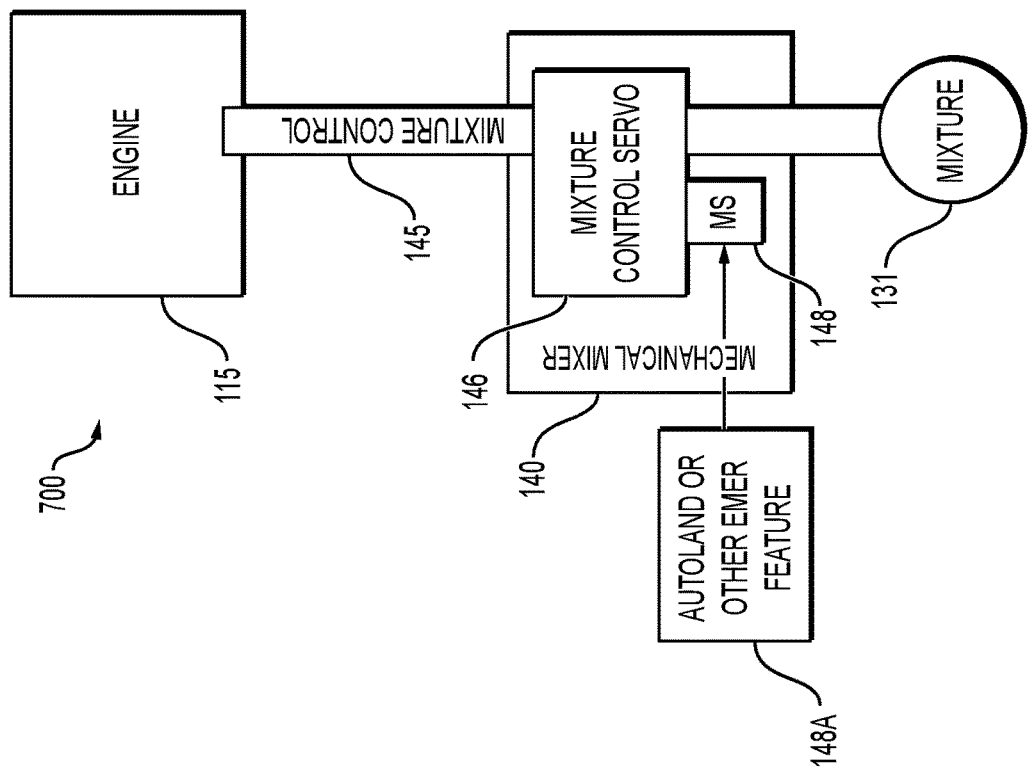
FIG. 7 is a schematic diagram showing yet another embodiment of a mixture-control configuration.

FIG. 7 is a schematic diagram showing an emergency advance mixture configuration 700, which includes an electro-mechanical emergency advance option for controlling the fuel-air mixture. In operation, the pilot manipulates the mixture normally via mixture lever 131 until emergency control is needed. As with single-servo mixture drive 500 of FIG. 5, the mixture control output is provided to engine 115 for engine mixture control via linkage 145. In emergency advance mixture configuration 700, a mixture input 148A is provided (e.g., via avionics) to mixture boost solenoid 148, which is used to adjust the fuel-air mixture for auto-land or other emergency situations. For example, mixture input 148A may include a mixture boost command (e.g., "000"), which is sent to mixture boost solenoid 148 to drive maximum mixture settings for emergency or back-up operations. This allows for the mixture to be placed into the full-rich state for the remainder of the flight (e.g., when using an auto-land operation). Alternatively, the boost solenoid may be engaged automatically as a back-up feature. For example, if the pilot forgets to advance the mixture, the boost solenoid may be engaged based on barometric pressure and operating conditions of engine 115.

Figure 8:
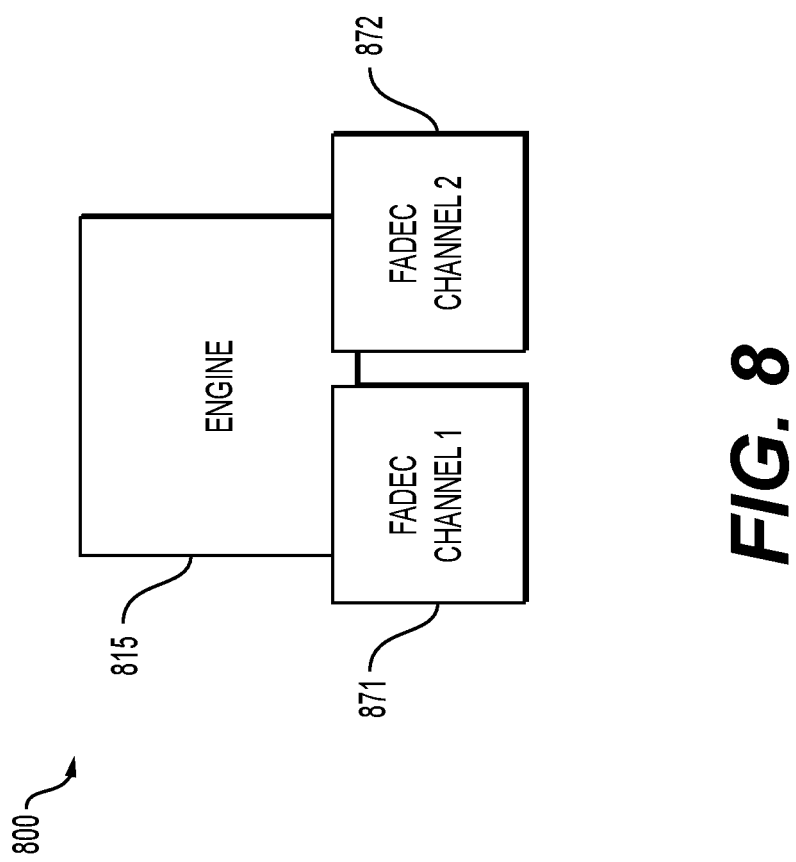
FIG. 8 is a schematic diagram showing an embodiment for providing automated mixture control and optionally automated propeller control.

FIG. 8 is a schematic diagram showing a FADEC mixture-control configuration 800 to automatically control the fuel-air mixture via dual-redundant channels communicatively coupled with a FADEC engine 815. In configuration 800, the FADEC provides digital control, while engine 815 performs the mixing. A first channel 871 provides independent control and monitoring paths between FADEC engine 815 and a fuel-air mixture device within FADEC engine 815, and a second channel 872 provides independent control and monitoring paths between FADEC engine 815 and the fuel-air mixture device.

Figure 11:
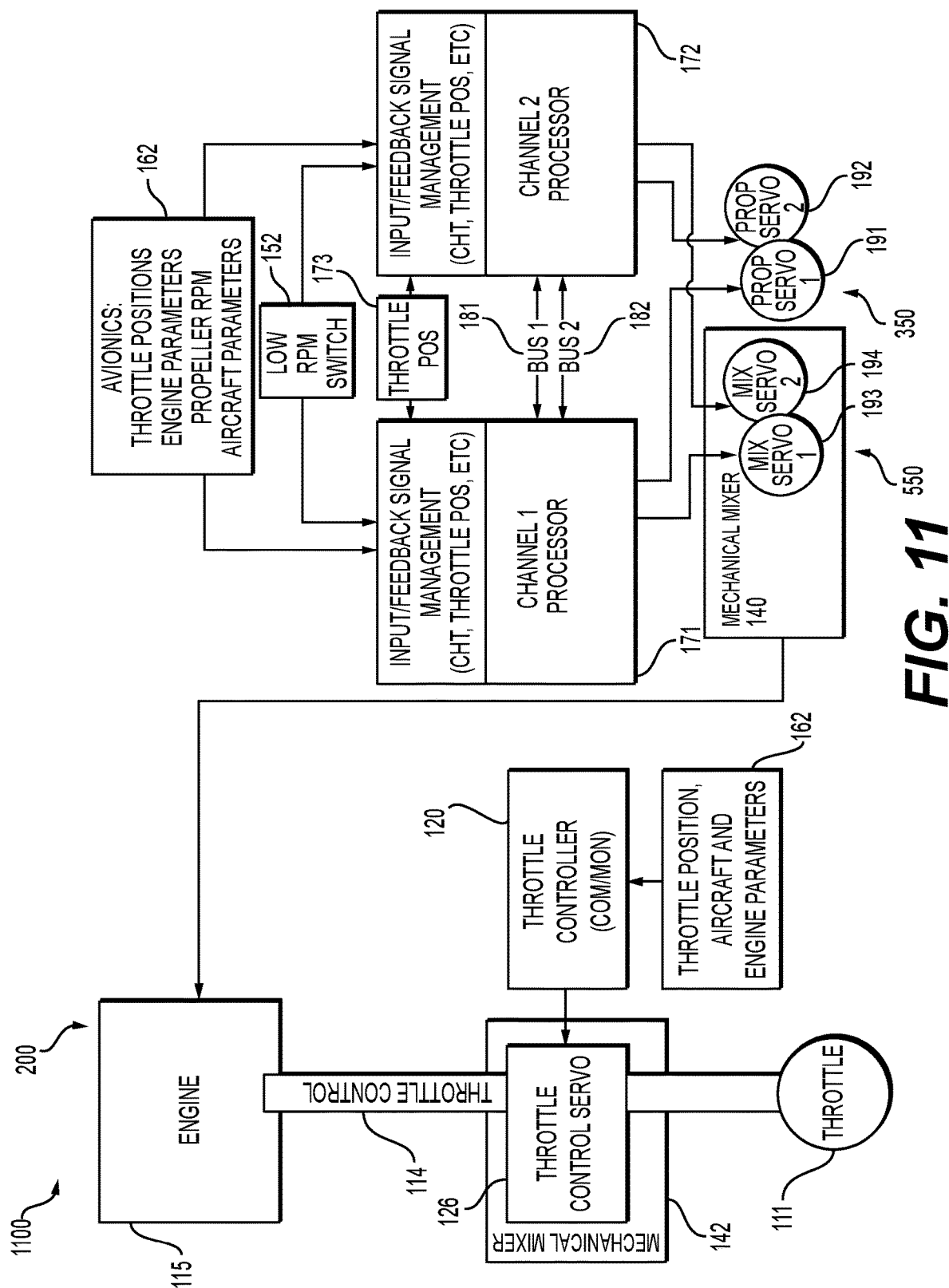
FIG. 11 is a schematic diagram showing yet another embodiment of a combination throttle-control, propeller-control, and mixture-control configuration.

In another embodiment, a dual-redundant servo drive 550 with electronic control is provided for controlling the air-fuel mixture (see FIG. 11). With this option there is no mechanical link to the mixture lever. This configuration is intended for use with a full authority digital electronic control (FADEC) engine. For example, FIG. 11 shows an embodiment having first mixture servo 193 and second mixture servo 194 for providing mixture control. Dual servo control is used with monitoring to ensure proper mixture control.

Combination Embodiments

Depending on a specific type of piston or other engine type in which automatic aircraft powerplant control system 100 of FIG. 1 is employed, different arrangements of propeller control and mixture control may be coupled with the throttle. The different arrangements take advantage of various options for propeller control and various options for fuel-air mixture control. The different arrangements may be accomplished via specific combinations of mechanical assemblies, solenoid valves, and/or electro-mechanical servos. Additionally, the different arrangements of automatic aircraft powerplant control system 100 are configured for adding onto existing engines such that certification of the engine is not affected. Below are some non-limiting examples.

Figure 9:
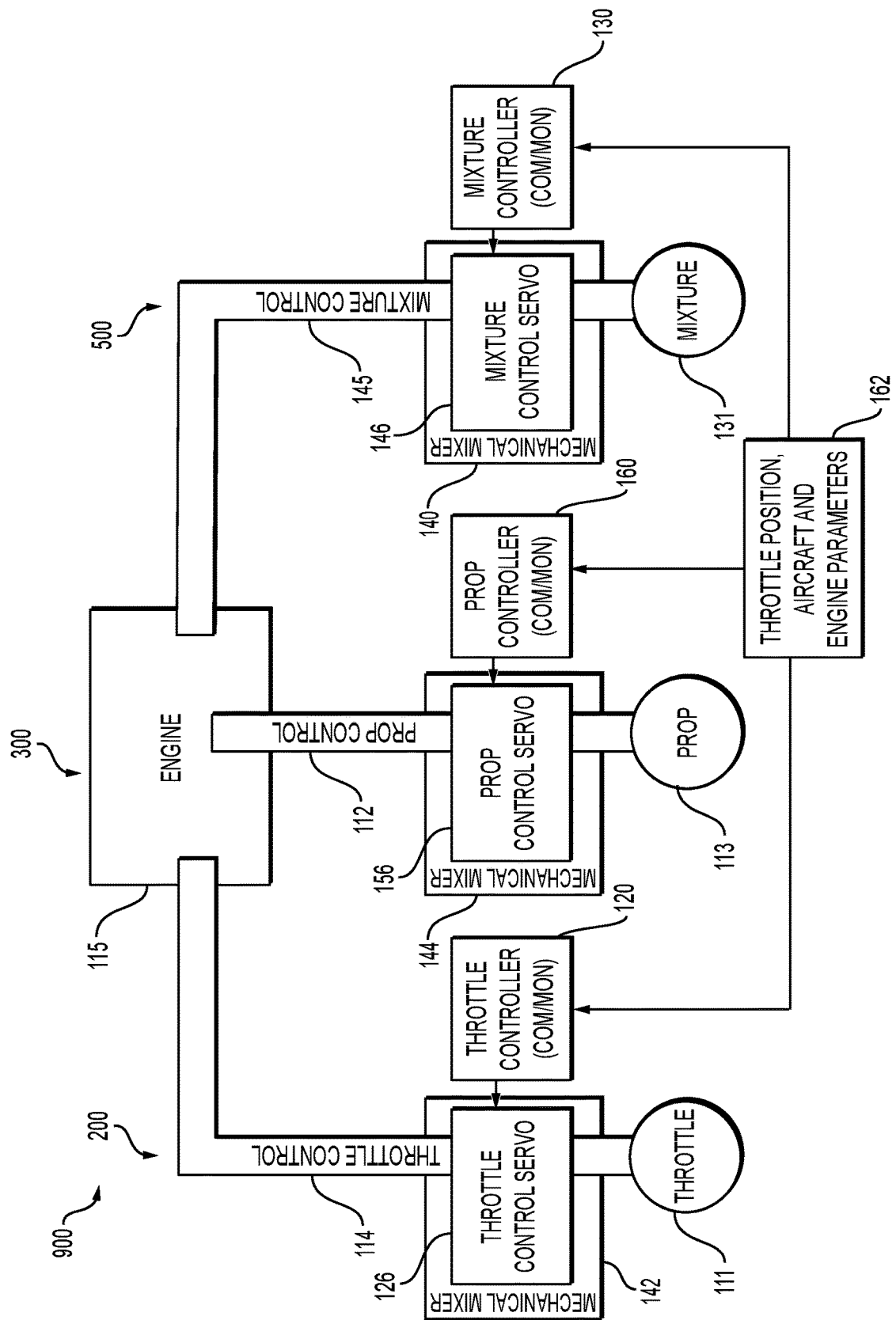
FIG. 9 is a schematic diagram showing a combination throttle-control, propeller-control, and mixture-control configuration, in an embodiment.

FIG. 9 is a schematic diagram showing an automatic aircraft powerplant control system 900 comprising throttle-control configuration 200 of FIG. 2, single-servo propeller drive 300 of FIG. 3, combined with single-servo mixture drive 500 of FIG. 5. System 900 combines independent engine controls to provide full automation of engine control throughout all phases of aircraft flight.

Figure 10:
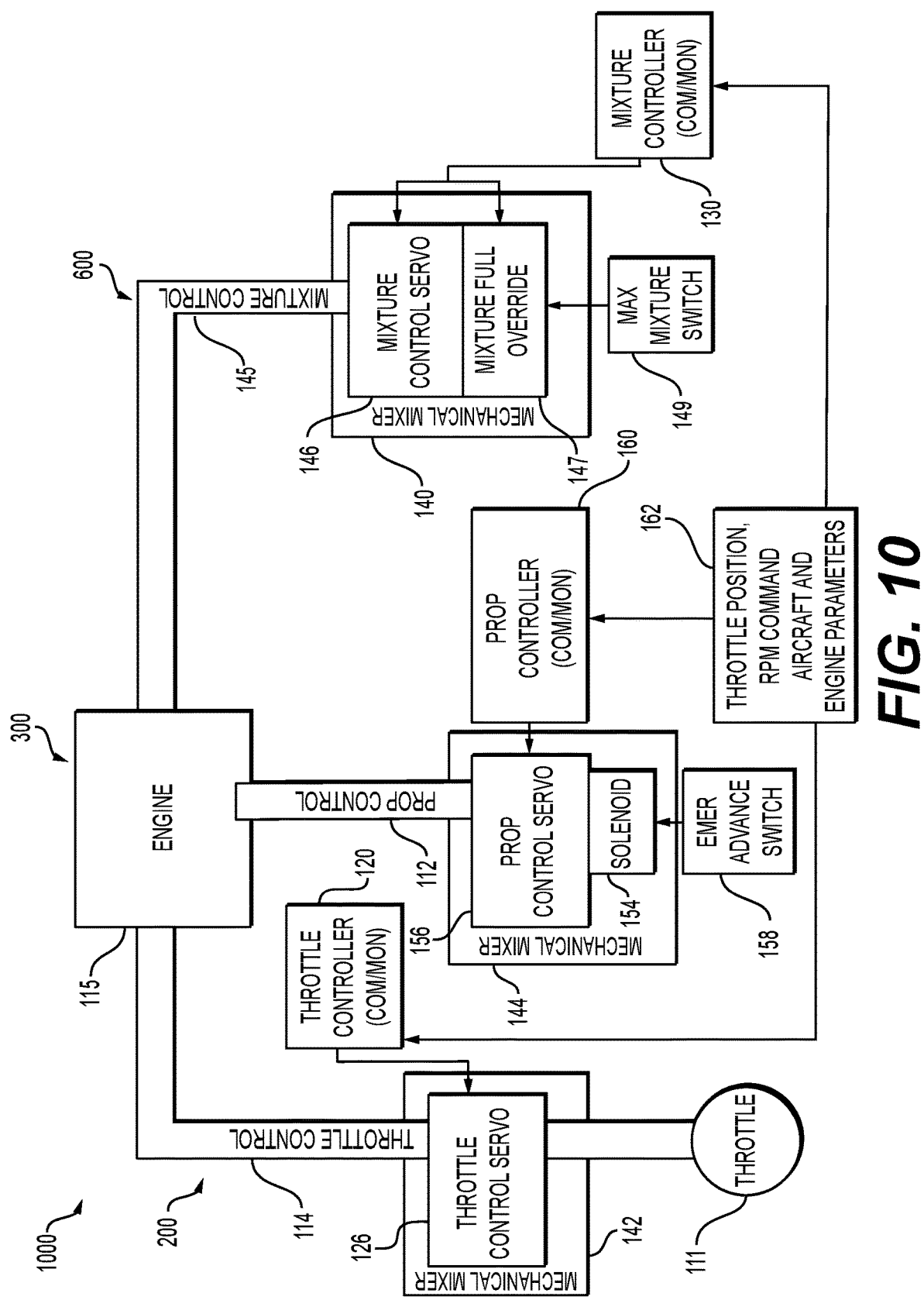
FIG. 10 is a schematic diagram showing another embodiment of a combination throttle-control, propeller-control, and mixture-control configuration.

FIG. 10 is a schematic diagram showing an automatic aircraft powerplant control system 1000, which includes throttle-control configuration 200 of FIG. 2, single-servo propeller drive 300 of FIG. 3, combined with automated single-servo mixture drive 600 of FIG. 6. Power control lever 111 provides a single lever for a pilot to control the throttle, propeller, and air-fuel mixture. As described above in connection with FIG. 3, emergency-advance switch 158 enables the pilot to select the high RPM state of the propeller for the remainder of the flight. As described above in connection with FIG. 6, max-mixture switch 149 may be used by the pilot to activate mixture full-override device 147, which overrides mixture control servo 146 to provide a full-rich mixture to engine 115 for the remainder of the flight.

FIG. 11 is a schematic diagram showing an automatic aircraft powerplant control system 1100 in which the fuel-air mixture and the propeller are controlled automatically for use with a non-FADEC engine. In embodiments, dual-redundant servo drive 350 for propeller control is combined with dual-redundant servo drive 550 for mixture control. For example, dual-redundant servo drive 350 uses first propeller servo 191 and second propeller servo 192 to provide dual electronic control of propeller speed, and dual-redundant servo drive 550 uses first mixture servo 193 and second mixture servo 194 to provide mixture control. A switch or selector (e.g., propeller RPM switch 152) may be used to select the preferred cruise propeller speed. Power control lever 111 provides a single lever for a pilot to control the aircraft power based on a position of power control lever 111.

Propeller control is determined automatically based on a throttle position 173 (e.g., a position of power control lever 111) and aircraft and engine parameters (manifold pressure, altitude, attitude, airspeed, etc.) via redundant dual-channel processors. As depicted in FIG. 11, the redundant dual-channel processors include a first processor 171 for a first channel and a second processor 172 for a second channel. Avionics bus 162 provides inputs to each of the first and second processors 171, 172, including, for example, throttle control commands, cylinder-head temperature (CHT) feedback, engine exhaust gas temperature (EGT) feedback, propeller speed, and fuel flow. Throttle position 173 is provided as an input signal to the processors 171, 172 from a position sensor (e.g., a rotary variable differential transformer (RVDT)) based on a position of power control lever 111. Propeller RPM switch 152 provides input signals for low or high propeller speed ranges to the processors 171, 172.

In certain embodiments, output signals from first and second processors 171, 172 are sent independently to dual-redundant propeller servos, namely first propeller servo 191 and second propeller servo 192, to provide propeller control. In some embodiments, output signals from first and second processors 171, 172 are sent independently to dual-redundant mixture servos, namely first mixture servo 193 and second mixture servo 194, to provide mixture control.

A first bus 181 and a second bus 182 enable cross-communication between first and second processors 171, 172 for channel-to-channel monitoring. Redundant control channels and processors 171, 172 are configured to provide a safe-mode for controlling the fuel-air mixture after any single failure. Automatic aircraft powerplant control system 1100 enables simple throttle control implementation compatible with auto-land capability.

Figure 12:
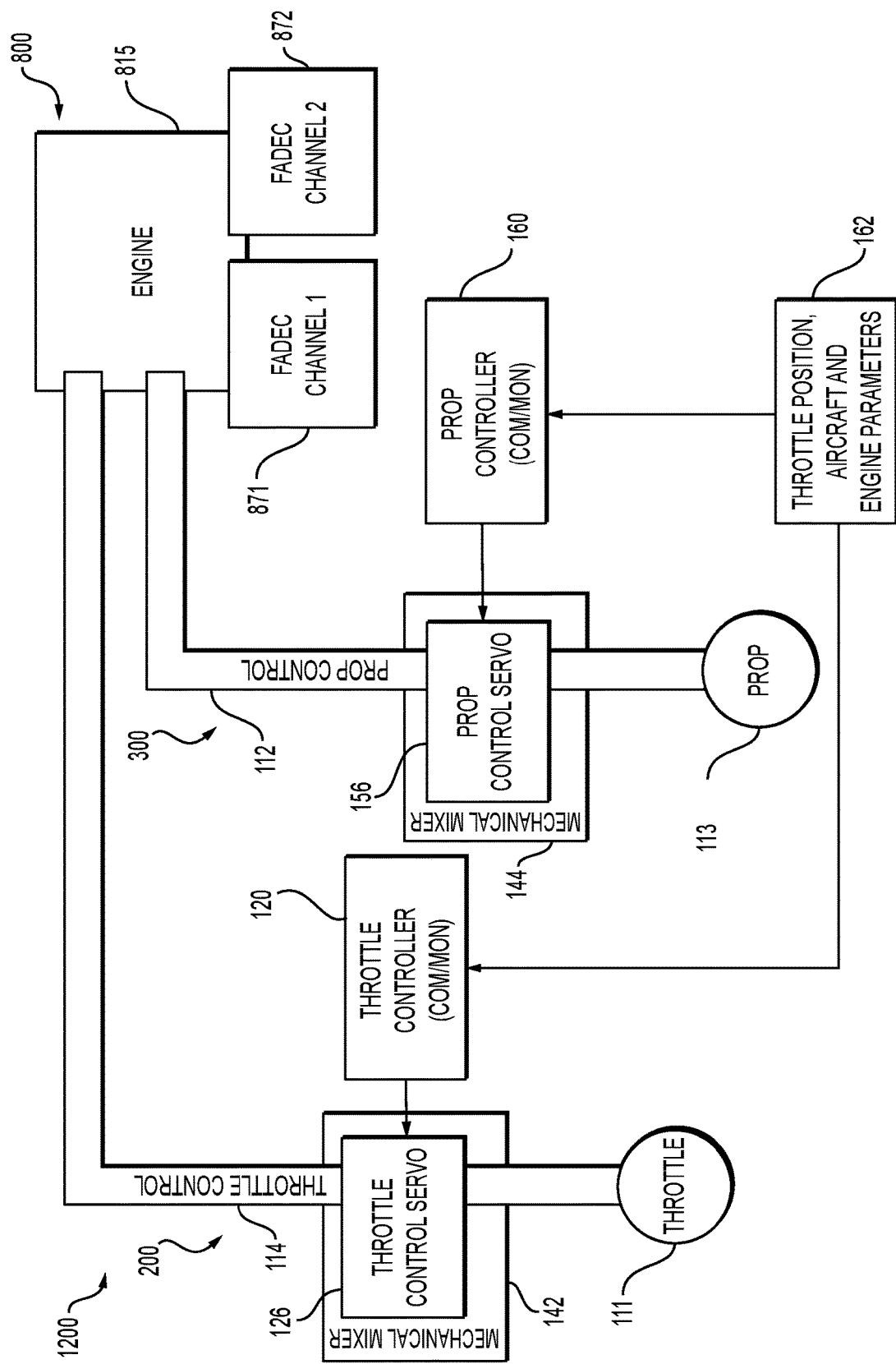
FIG. 12 is a schematic diagram showing still another embodiment of a combination throttle-control, propeller-control, and mixture-control configuration.

FIG. 12 is a schematic diagram showing an automatic aircraft powerplant control system 1200, which includes throttle-control configuration 200 of FIG. 2, single-servo propeller drive 300 of FIG. 3, combined with FADEC mixture-control configuration 800 of FIG. 8. In an alternative embodiment, dual-redundant servo drive 350 of FIG. 11 is provided in place of single-servo propeller drive 300, whereby first propeller servo 191 and second propeller servo 192 provide dual electronic propeller control, which is combined with FADEC engine 815 of FIG. 8 for providing mixture control. A switch or selector may be used to select the preferred cruise propeller speed via the propeller controller.

Figure 13:
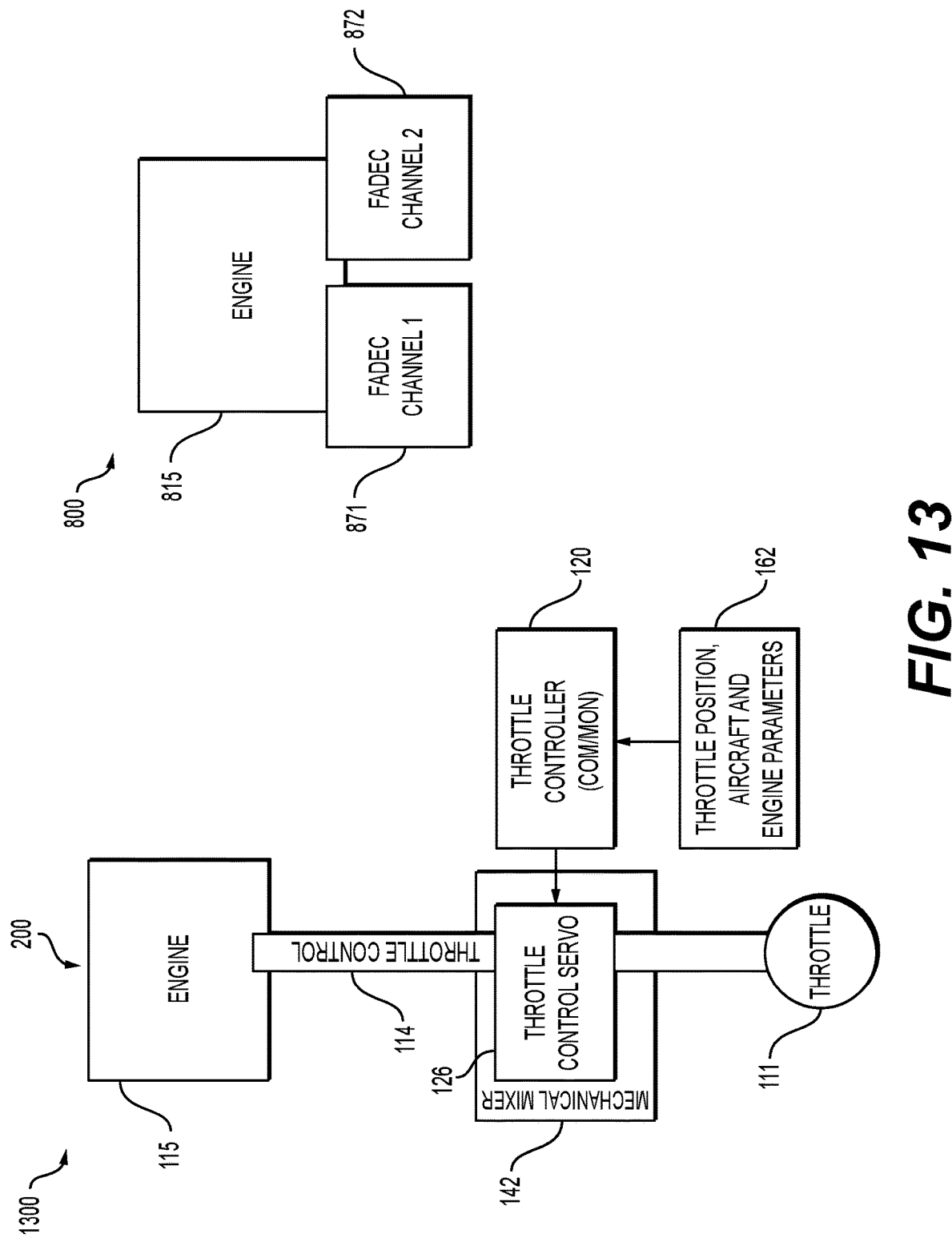
FIG. 13 is a schematic diagram showing an embodiment for use with automated mixture control and automated propeller control.

FIG. 13 is a schematic diagram showing an automatic aircraft powerplant control system 1300 in which throttle-control configuration 200 of FIG. 2 is combined with FADEC mixture-control configuration 800 of FIG. 8. System 1300 relies on FADEC engine 815 to provide both propeller control and mixture control. Power control lever 111 provides a single lever for a pilot to control the aircraft power since propeller control and mixture control are performed by the FADEC controller of engine 815.

Control Architecture

In some embodiments for controlling the throttle, propeller speed and pitch, and fuel-air mixture from a single power control lever 111, a basic closed loop control structure may be employed, which enables a more generic engine scheduling. For the fuel-air mixture, fuel leaning and economy is maximized based on CHT, EGT or oxygen feedback. For propellor control, the closed loop control structure is configured to govern propeller speed, which may include an optional low or selectable RMP mode for operations when a quiet cabin is preferred. A power cable coupled to the body of power control lever 111 may be maintained for mechanical throttle control with a servo for pilot selectable automated control. This embodiment uses at least one propeller servo and at least one mixture servo to provide propeller and fuel-air mixture control, respectively. Engine power is mechanically scheduled via a throttle body butterfly valve position from the body of power control lever 111, which may be similar to existing mechanical fuel injection systems. A safe mode provides a "rich enough" mixture for continued safe flight and landing with normal throttle level control. In the event of a loss of servo control, a full-rich mixture is used with high RPM propeller control.

In embodiments, a more complex closed loop control structure may be employed to control the throttle, propeller speed and pitch, and fuel-air mixture from a single power control lever 111. For the fuel-air mixture, fuel metering may be customized based on air flow, instead of using butterfly valve position from the body of power control lever 111, which provides a correction for altitude based on air density. A mass airflow sensor is used to provide the air flow data. For the fuel-air mixture, fuel leaning and economy is maximized based on CHT and EGT feedback or oxygen feedback from an oxygen sensor located in the fuel-air mixture. The closed loop control structure is configured to govern propeller speed, which may include an optional low RMP mode for operations when a quiet cabin is preferred. Instead of having a power cable coupled to the body of power control lever 111, full throttle-by-wire control is provided. This requires the addition of a throttle-body butterfly servo and a fuel-metering control servo in addition to a mixture servo. A dedicated backup power source is provided in case of a main alternator failure combined with a loss of the primary battery. A safe mode provides a "rich enough" mixture for continued safe flight and landing with normal throttle level control.

Autostart

To start many existing aircraft, the pilot manipulates the throttle and mixture controls with the right hand while engaging the starter switch with the left hand. Once the engine fires, the pilot must then quickly readjust controls to allow the engine to run properly. Embodiments described herein include an auto-start system for aircraft that provides automated engine start up by manipulating throttle and mixture control. The pilot initiates startup of the engine using a simple start switch, and then the auto-start system automatically completes all startup tasks, followed by entering a standby mode.

In embodiments, with the aircraft master power switch turned on, the pilot activates the "start" switch (e.g., pushes the start button) when ready to start the engine. When the start button is pressed for the first time, an auto-start controller determines the engine state based on outside air temperature (OAT) and engine CHT, and whether the engine has excessive fuel in the cylinders. The auto-start controller then initiates the proper start sequence based on the current engine state. Specifically, a cold start sequence is used if the engine CHT is cold or at ambient temperature; a hot start sequence is used if the engine CHT is greater than a set temperature or if ambient temperatures are hot; or, a flooded start sequence is used when the engine has excessive fuel in the cylinders requiring a special start sequence.

The auto-start controller may be embodied as a control board having one or more of a printed circuit board (PCB), a computer, a microcontroller, a microprocessor, or a programmable logic controller (PLC), having a memory, including a non-transitory medium for storing software/firmware, and a processor for executing instructions of the software/firmware. The auto-start controller is communicatively coupled with mixture control and throttle control. The auto-start controller is also communicatively coupled with the engine start circuit for starting the engine and the fuel pump for controlling fuel flow to the engine.

In certain embodiments, the auto-start system is configured to enable normal manual starting operation when the auto-start system is turned off. In this case, the pilot has normal control of the throttle and mixture, and the start switch is a momentary switch that provides engagement of the start solenoid while the start switch is engaged. This provides a back-up function in case the auto-start system fails.

Figure 14:
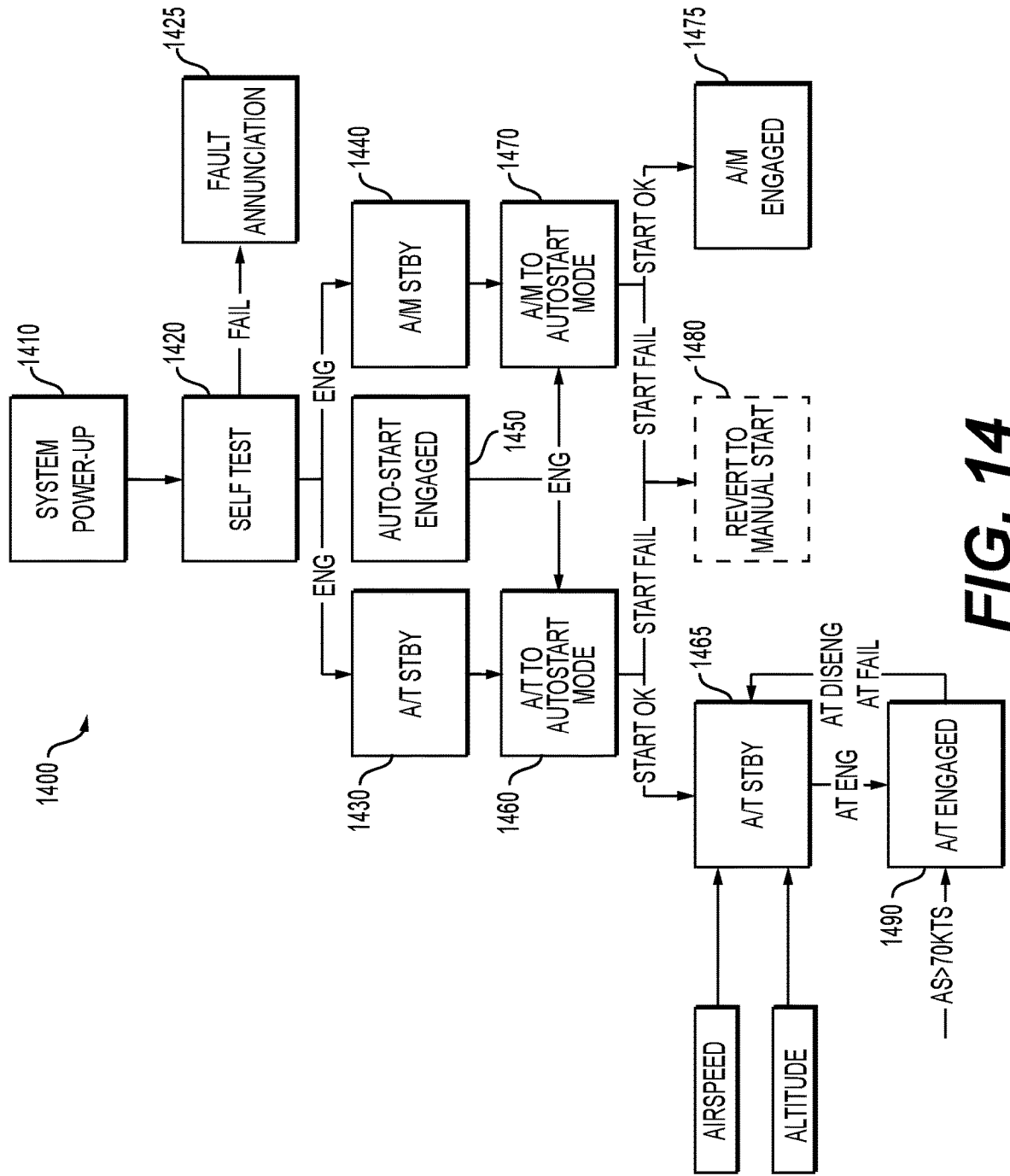
FIG. 14 is a flow diagram of a power-up sequence for an aircraft equipped with an auto-start function, in an embodiment.

FIG. 14 is a flow chart showing an exemplary power-up sequence 1400 having an auto-start mode. The auto-start mode is provided via the auto-start system described above. Power-up sequence 1400 may be performed using one of automatic aircraft powerplant control systems 900, 1000, 1100, or 1200 described above.

Prior to step 1410, aircraft power is initiated (e.g., the aircraft master power switch is turned on), which enables the start button. Otherwise, the start button is effectively locked out.

In a step 1410, a system power-up is accomplished including initialization of all system components.

In a step 1420, a self-test is performed once the system is initialized. In an example of step 1420, the auto-start controller performs a self-test of the auto-start system. The self-test may include a series of signals (e.g., pings) sent to/from the auto-start controller and various aircraft components and sensors to test that they are in an active or standby state. If the self-test confirms that the auto-start system is ready, power-up sequence 1400 proceeds with steps 1430 and 1440, followed by step 1450. Otherwise, if the self-test fails, a fault is announced in a step 1425.

Step 1425 provides a fault annunciation. In an example of step 1425, an indicator is activated to indicate that a fault with the self-test has occurred. The indicator may include one or more of a light, a sound, or a text display, or crew alerting system annunciation, for example.

In a step 1430, a throttle control is placed into a standby state. In an example of step 1430, an electronic throttle control reports availability and awaits engagement for engine starting while in the standby state.

In a step 1440, an mixture control standby function is engaged. In an example of step 1440, mixture controller 130 of FIG. 9 automatically sets the fuel-air mixture to a predetermined ratio. In another example of step 1440, the redundant dual-channel processors 171, 172 of FIG. 11 set the fuel-air mixture to the predetermined ratio.

In a step 1450, an auto-start function is engaged. In an example of step 1450, the auto-start controller determines the current engine state based on OAT and engine CHT, and whether the engine has excessive fuel in the cylinders. The auto-start controller then selects the proper engine start sequence based on the current engine state and initiates the selected engine start sequence. The engine start sequences are described below in FIGS. 15A and 15B. After the auto-start function is engaged in step 1450, the auto-start modes for throttle control and mixture control functions are entered in a step 1460 and a step 1470, respectively.

In step 1460, throttle control enters the auto-start mode. Meanwhile, in a step 1470, mixture control enters the auto-start mode. Specifically, the auto-start controller initiates an engine start sequence based on the current engine state. For example, a cold-start mode is entered if the engine CHT is less than 100° F. and the throttle is not open; a hot-start mode is entered if the engine CHT is greater than 100° F. and the throttle is not open; or, a flooded-start mode is entered when the throttle is open. Alternative CHT temperatures may be selected, other than 100° F., without departing from the scope hereof. The cold-start mode, hot-start mode, and the flooded-start mode for throttle control and mixture control are further described below in connection with FIGS. 15A and 15B.

If the auto-start modes successfully start the engine, step 1460 proceeds to a step 1465 to enter throttle control standby, and step 1470 proceeds to a step 1475 to engage mixture control. Throttle control standby in step 1465 is waiting on flight engagement, in contrast to the standby state in step 1430, which is waiting on engine start.

In step 1465, the aircraft remains in throttle control standby until the aircraft has reached a predetermined airspeed and altitude. Then power-up sequence 1400 proceeds with a step 1490 in which throttle control is engaged. In an example of step 1465, throttle control remains in standby until the aircraft has reached a predetermined minimum airspeed (e.g., 70-knots or greater), at which point throttle control is engaged in step 1490.

Meanwhile, in step 1475, mixture control is engaged. This is further described below for a cold-start, a hot-start, or a flooded-start in connection with steps 1524, 1554, and 1584 of FIG. 15A, respectively.

If the auto-start mode fails to start the engine, in some embodiments the power-up sequence 1400 may proceed to optional step 1480 for reverting to a manual start. Optional step 1480 is only available on aircraft that are equipped for performing a manual start. Otherwise, if a manual start is not an option, power-up sequence 1400 ends, and after an appropriate cool-down period (if necessary), power-up sequence may be repeated by returning to step 1410.

The order in which steps of power-up sequence 1400 are performed may be modified for use with different types of aircraft. For example, due to procedures determined by a given engine manufacturer or original-equipment manufacturer (OEM), or when a new or modified engine application is implemented, the order of steps for power-up sequence 1400 may be modified.

Figure 15A:
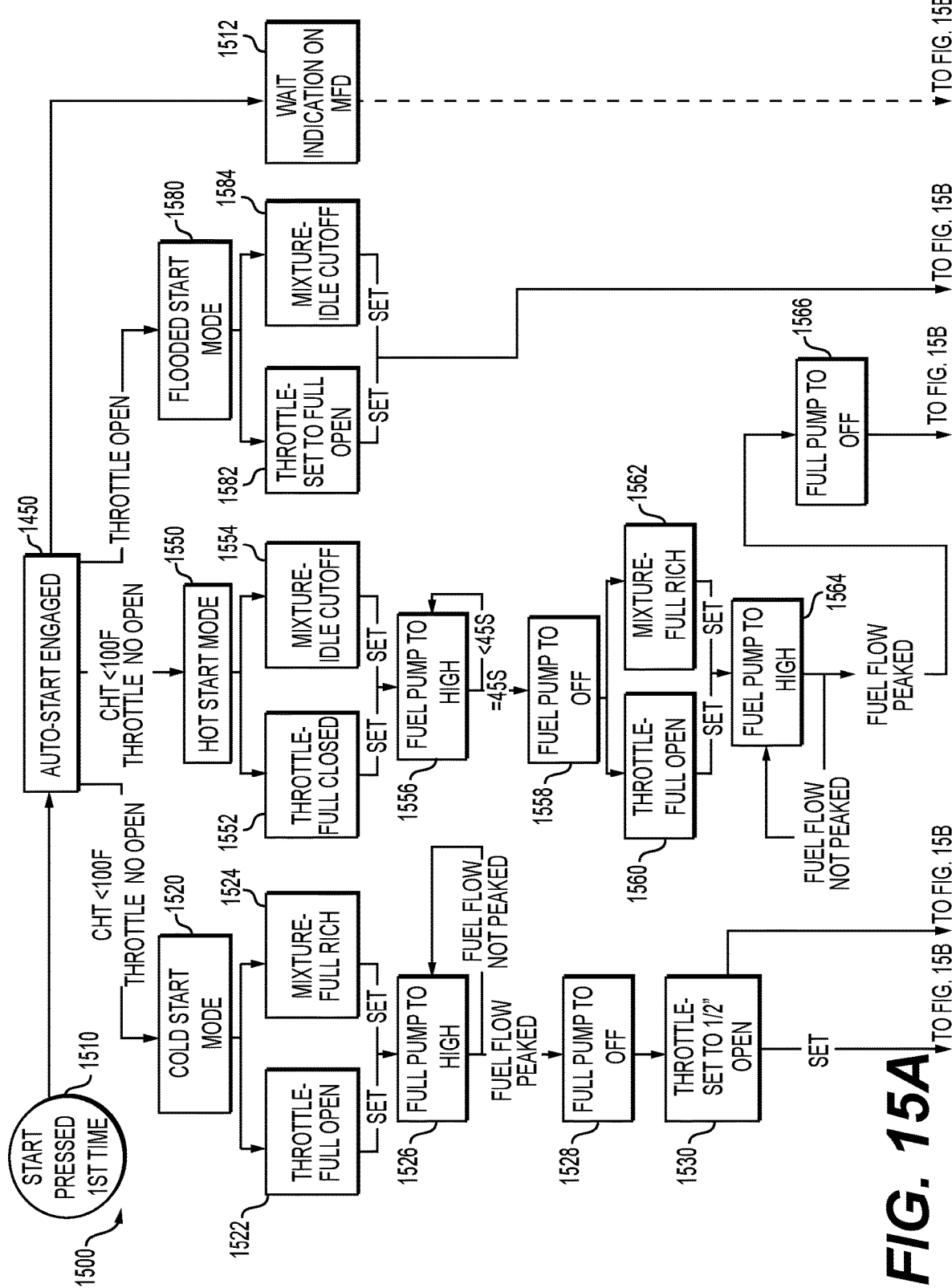
FIG. 15A is a flow diagram of a first portion of an auto-start sequence for an aircraft equipped with an auto-start function.
Figure 15B:
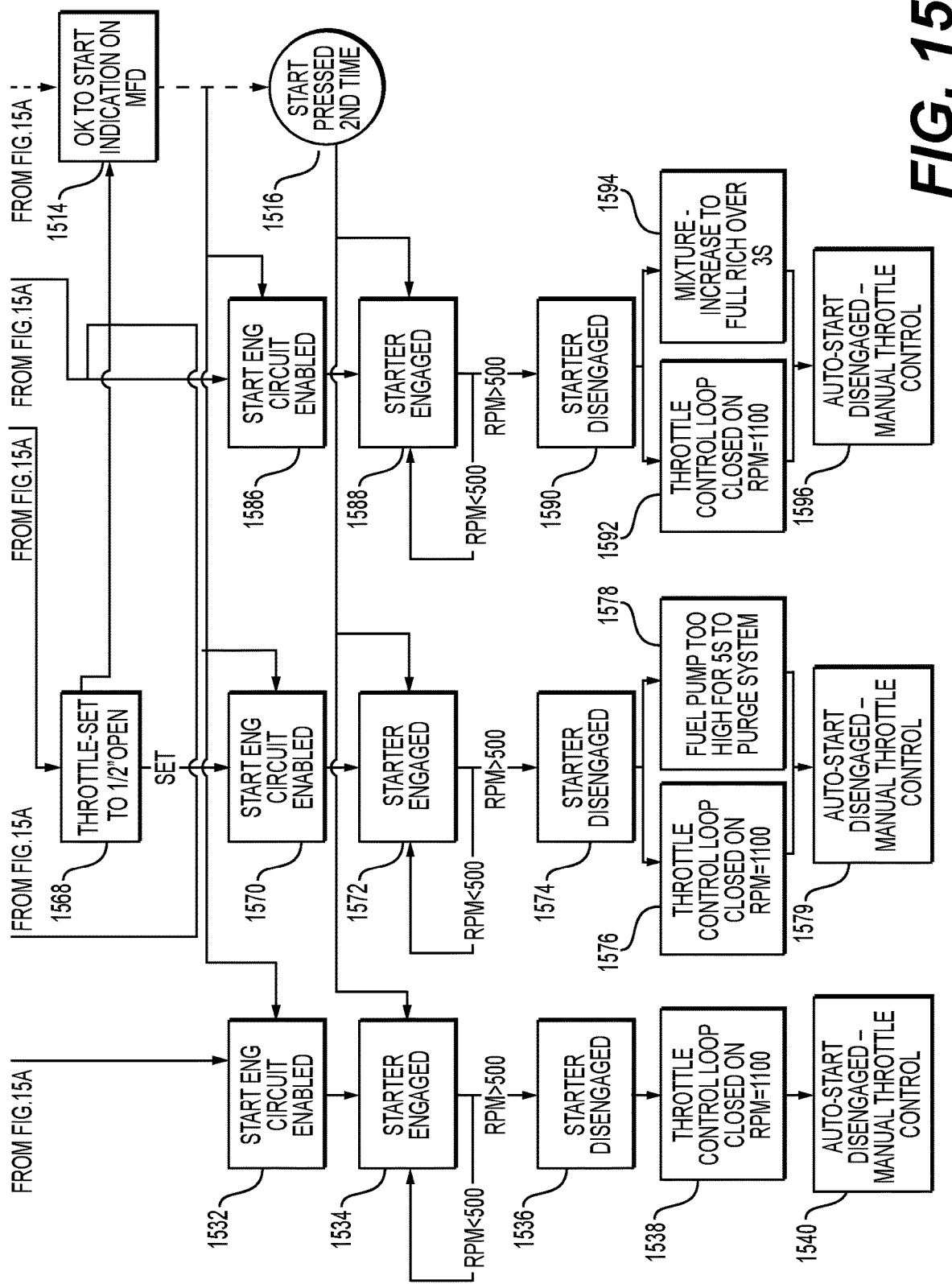
FIG. 15B is a flow diagram of a second portion of the auto-start sequence of FIG. 15A.

FIGS. 15A and 15B show a flow chart for an exemplary auto-start sequence 1500. Auto-start sequence 1500 may be performed using one of automatic aircraft powerplant control systems 900, 1000, 1100, or 1200 described above.

In a step 1510 of FIG. 15A, the auto-start system is initiated via a start switch, and the auto-start system is engaged in step 1450 as described above. In an example of step 1510, a pilot activates the auto-start system for a first time by pushing a start button, which puts the auto-start controller in a "pre-start" mode. During the pre-start mode, pressing the start button/switch does nothing to prevent premature engine cranking. In embodiments, the start switch is engaged directly to the starter solenoid when the auto-start system is unpowered or disabled (e.g., via a "disabled" switch).

Once the auto-start system is engaged in step 1450, the auto-start controller initiates the proper start sequence based on the current engine state. Specifically, the cold-start mode is entered, auto-start sequence 1500 proceeds with a step 1520; if the hot-start mode is entered, auto-start sequence 1500 proceeds with a step 1550; and, if the flooded-start mode is entered, auto-start sequence 1500 proceeds with a step 1580.

Meanwhile, as one of the auto-start sequences is initiated, an indication that the aircraft is not yet ready to start is provided to the pilot in a step 1512. In an example of step 1512, a "wait" indication is provided on the main flight display in the aircraft cockpit. The wait indication remains on during a "pre-start" portion of the auto-start mode (regardless of which auto-start mode is selected). Once the pre-start portion is complete, an indication that the aircraft is ready to start is provided to the pilot in a step 1514 of FIG. 15B. Then, a start-engine circuit is enabled (e.g., in one of steps 1532, 1570, and 1586), and the start switch is activated a second time, in a step 1516. These steps are further described below in connection with their respective auto-start sequence.

For a cold engine start, the cold-start mode is selected in step 1520. In an example of step 1520, the auto-start controller selects the cold-start mode for the throttle control and mixture control functions. The cold-start mode includes steps 1522 to 1540 below step 1520 as shown in FIGS. 15A and 15B.

In a step 1522, the throttle control is opened to an appropriate preset position based on the type of aircraft. In an example of step 1522, the throttle control is set to 5% open to 10% open. In another example of step 1522, the throttle is fully opened.

In a step 1524, the mixture control is set to the appropriate position based on the type of aircraft. In an example of step 1524, the mixture control is set to the "idle cutoff" position. In another example of step 1524, the mixture is set to "full rich".

In a step 1526, the fuel pump is set to "on". For airplanes that are appropriately equipped, the fuel pump may be set to "high". The cold auto-start sequence remains at step 1526 until the fuel pressure has peaked. In an example of step 1526, the fuel pump is set to on/high until the auto-start controller verifies that the fuel flow has peaked.

In a step 1528, the fuel pump is set to "off".

In a step 1530, the throttle control is adjusted to the "start" position. In an example of step 1530, the throttle control is set to 5% open to 10% open.

Steps 1522 through 1530 are prior to engine start and therefore may be referred to herein as the pre-start portion of the cold auto-start mode. Following step 1530, the pre-start portion is complete and the cold auto-start sequence proceeds to a step 1514 and a step 1532, which are shown in FIG. 15B.

In a step 1514 of FIG. 15B, an indication that the aircraft is ready to start is provided to the pilot. In an example of step 1514, the "wait" indication of step 1512 is changed to a "ready to start" indication on the main flight display.

In a step 1532, a start-engine circuit is enabled. In an example of step 1532, cranking of the engine via the start switch is enabled.

In a step 1516, the start switch is activated a second time. In an example of step 1516, the pilot pushes and manually holds the start button while the starter is engaged in a step 1534 until the engine fires, then the pilot releases the start button. In another example of step 1516, the pilot pushes and releases the start button, and the auto-start controller automatically latches the start switch to remain activate until the engine fires. For the automatic latching option, the pilot may press the start button again to disengage the starter and abort the auto-start sequence.

In step 1534, the engine starter is engaged. In an example of step 1534, the engine started is engaged (e.g., either manually or automatically from step 1516) until the engine cranks up to a speed of 500-RPM.

In a step 1536, the engine starter is disengaged. In an example of step 1536, the starter disengages once the speed exceeds a preset value (e.g., 500-RPM or 800-RPM). For the manual option, the pilot releases the start button. For the automatic option, the auto-start controller unlatches the start switch.

In a step 1538, the throttle control is adjusted to achieve the proper engine idle speed. In an example of step 1538, the engine start is verified by the auto-start controller based on the engine speed (e.g., 800-RPM or 1200-RPM) and the throttle control loop is closed on a predetermined engine speed (e.g., 1200-RPM).

In a step 1540, the cold auto-start sequence ends. In an example of step 1540, when the engine has successfully started, the auto-start system is disengaged and manual throttle-control is performed by the pilot. In another example of step 1540, when the engine fails to start within a predetermined duration, the auto-start sequence is aborted. After a predetermined cooldown time, the start switch can be used to restart the auto-start sequence at step 1510 of FIG. 15A.

For a hot engine start, the hot-start mode is selected in step 1550 of FIG. 15A. In an example of step 1550, the auto-start controller selects the hot-start mode for the throttle control and mixture control functions. The hot-start mode includes steps 1552 to 1579 below step 1550 as shown in FIGS. 15A and 15B.

In a step 1552, the throttle control is fully closed.

In a step 1554, the mixture control is set to the idle cutoff position.

In a step 1556, the fuel pump is turned on for a predetermined duration. For airplanes that are appropriately equipped, the fuel pump may be set to "high" for the predetermined duration. In an example of step 1556, the fuel pump is set to "on" for forty-five seconds.

In a step 1558, the fuel pump is set to "off". Following step 1558, the hot auto-start sequence proceeds to a step 1560 and a step 1562.

In step 1560, the throttle control is set to "full open".

In step 1562, the mixture control is set to "full rich".

In a step 1564, the fuel pump is set to "on". If the airplane is appropriately equipped, the fuel pump may be set to "high". The hot auto-start sequence remains at step 1564 until the fuel pressure has peaked. In an example of step 1564, the fuel pump is set to on/high until the auto-start controller verifies that the fuel flow has peaked.

In a step 1566, the fuel pump is turned off.

In a step 1568 of FIG. 15B, the throttle control is set to 5% open to 10% open.

Steps 1552 through 1566 are prior to engine start and therefore may be referred to herein as a "pre-start" portion of the hot auto-start mode. Following step 1568, the pre-start portion is complete and the hot auto-start sequence proceeds to step 1514, described above, and a step 1570 described below.

In step 1570, a start-engine circuit is enabled. In an example of step 1570, cranking of the engine via the start switch is enabled.

In step 1516, the start switch is activated a second time, as described above.

In step 1572, the engine starter is engaged. In an example of step 1572, the engine started is engaged (e.g., either manually or automatically from step 1516) until the engine cranks up to a speed of 500-RPM.

In a step 1574, the engine starter is disengaged. In an example of step 1574, the starter disengages once the speed exceeds a preset value (e.g., 500-RPM or 800-RPM). For the manual option, the pilot releases the start button. For the automatic option, the auto-start controller unlatches the start switch.

Following step 1574, the hot auto-start sequence proceeds to a step 1576 and a step 1578.

In step 1576, the throttle control is adjusted to achieve the proper engine idle speed. In an example of step 1576, the engine start is verified by the auto-start controller based on the engine speed (e.g., 800-RPM or 1200-RPM) and the throttle control loop is closed on a predetermined engine speed (e.g., 1200-RPM).

In step 1578, the fuel pump is turned on (or set to high if available) to purge the system. In an example of step 1578, the fuel pump is turned on for five seconds.

In a step 1579, the hot auto-start sequence ends. In an example of step 1579, when the engine has successfully started, the auto-start system is disengaged and manual throttle-control is performed by the pilot. In another example of step 1579, when the engine fails to start within a predetermined duration, the auto-start sequence is aborted. The start switch can then be used to restart the auto-start sequence at step 1510 of FIG. 15A.

For a flooded engine start, the flooded-start mode is selected in step 1580. In an example of step 1580, the auto-start controller selects the flooded-start mode for the throttle control and mixture control functions. The flooded-start mode includes steps 1582 to 1596 shown in FIGS. 15A and 15B below step 1580.

In a step 1582, the throttle control is set to "full open". The pilot may initiate the flooded-start mode by setting the throttle control to "full open" prior to pressing the "start" switch.

In a step 1584, mixture control is set to the "idle cutoff" position.

Steps 1582 and 1584 are prior to engine start and therefore may be referred to herein as a "pre-start" portion of the flooded auto-start mode. Following step 1584, the pre-start portion of the flooded auto-start mode is complete and the flooded auto-start sequence proceeds to step 1514, described above, and a step 1586 described below.

In step 1586 of FIG. 15A, a start-engine circuit is enabled. In an example of step 1586, cranking of the engine via the start switch is enabled.

In step 1516, the start switch is activated a second time, as described above.

In step 1588, the engine starter is engaged. In an example of step 1588, the engine started is engaged (e.g., either manually or automatically from step 1516) until the engine cranks up to a speed of 500-RPM.

In a step 1590, the engine starter is disengaged. In an example of step 1590, the starter disengages once the speed exceeds a preset value (e.g., 500-RPM or 800-RPM). For the manual option, the pilot releases the start button. For the automatic option, the auto-start controller unlatches the start switch.

Following step 1590, the flooded auto-start sequence proceeds to a step 1592 and a step 1594.

In step 1592, the throttle control is adjusted to achieve the proper engine idle speed. In an example of step 1592, the engine start is verified by the auto-start controller based on the engine speed (e.g., 800-RPM or 1200-RPM) and the throttle control loop is closed on a predetermined engine speed (e.g., 1200-RPM).

Meanwhile, in step 1594, the mixture is increased to "full rich" over a predetermined duration. In an example of step 1594, the mixture is increased to "full rich" over three seconds.

In a step 1596, the flooded auto-start sequence ends. In an example of step 1596, when the engine has successfully started, the auto-start system is disengaged and manual throttle-control is performed by the pilot. In another example of step 1596, when the engine fails to start within a predetermined duration, the auto-start sequence is aborted. The start switch can then be used to restart the auto-start sequence at step 1510 of FIG. 15A.

The order in which steps of auto-start sequence 1500 are performed may be modified for use with different types of aircraft. For example, due to procedures determined by a given engine manufacturer or original-equipment manufacturer (OEM), or when a new or modified engine application is implemented, the order of steps for auto-start sequence 1500 may be modified accordingly.

Operational Modes

Figure 16:
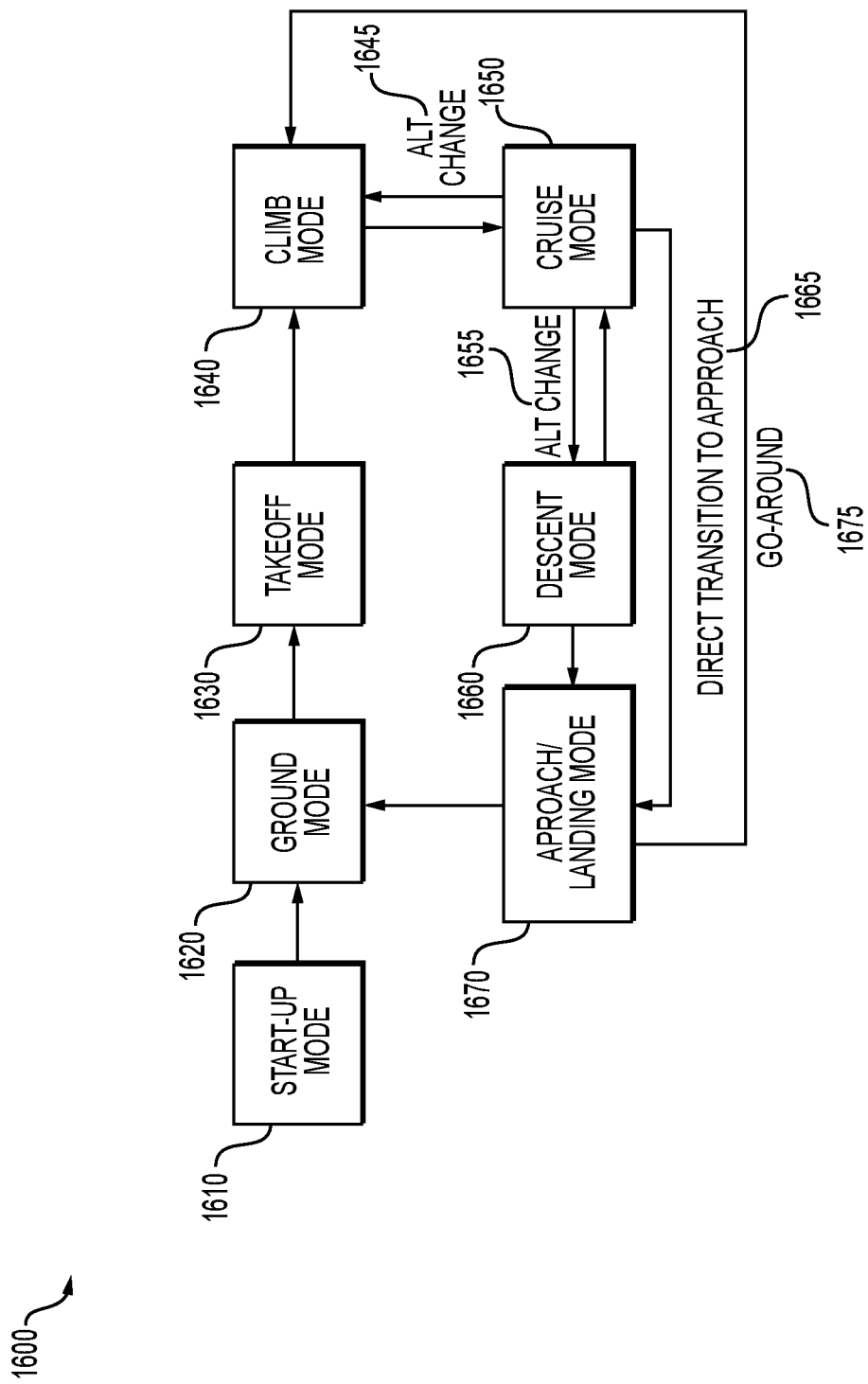
FIG. 16 is a flow diagram of aircraft operational modes, in an embodiment.
Figure 17:
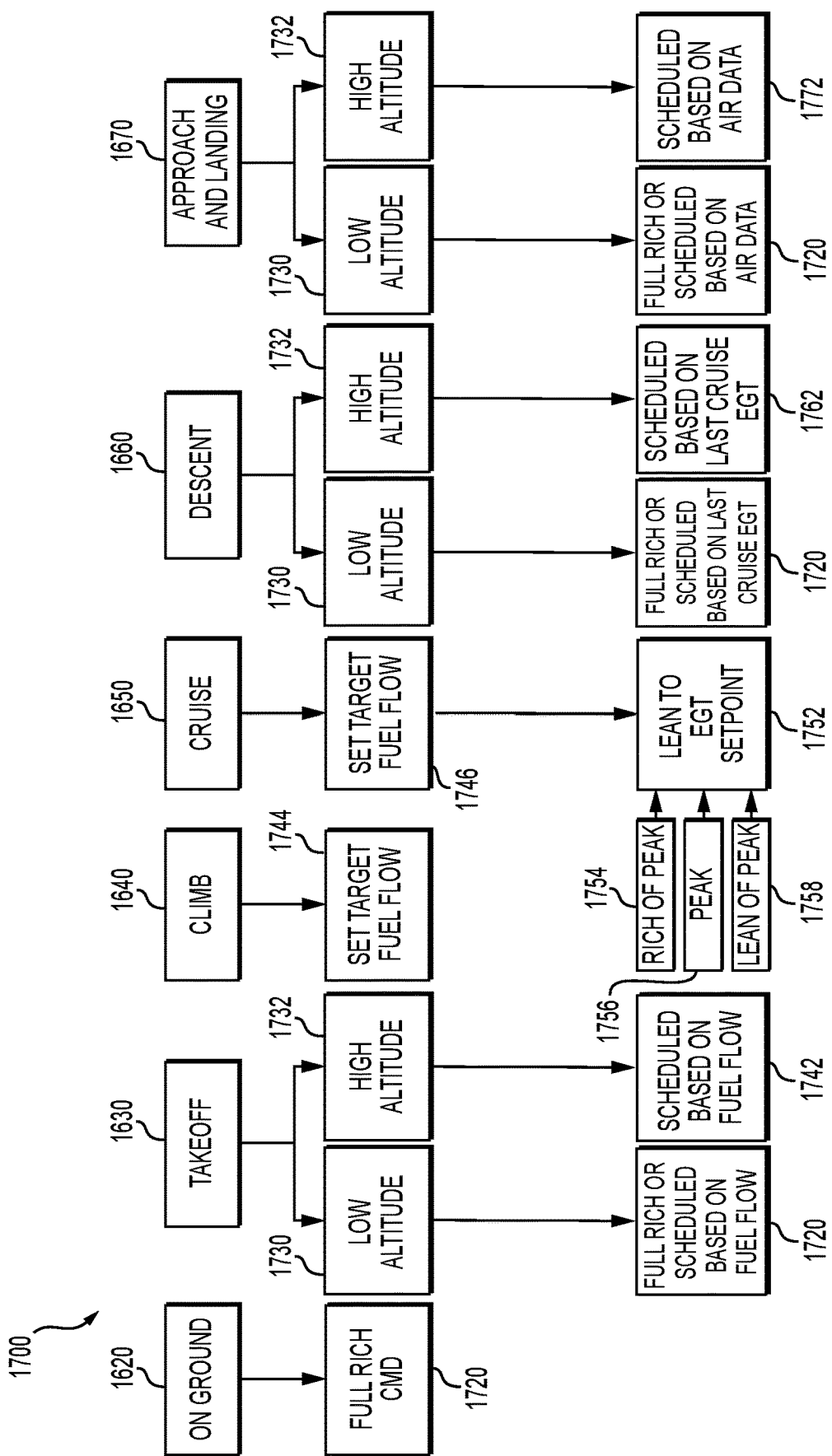
FIG. 17 is a flow diagram of auto-mixture operational control, in an embodiment.
Figure 18:
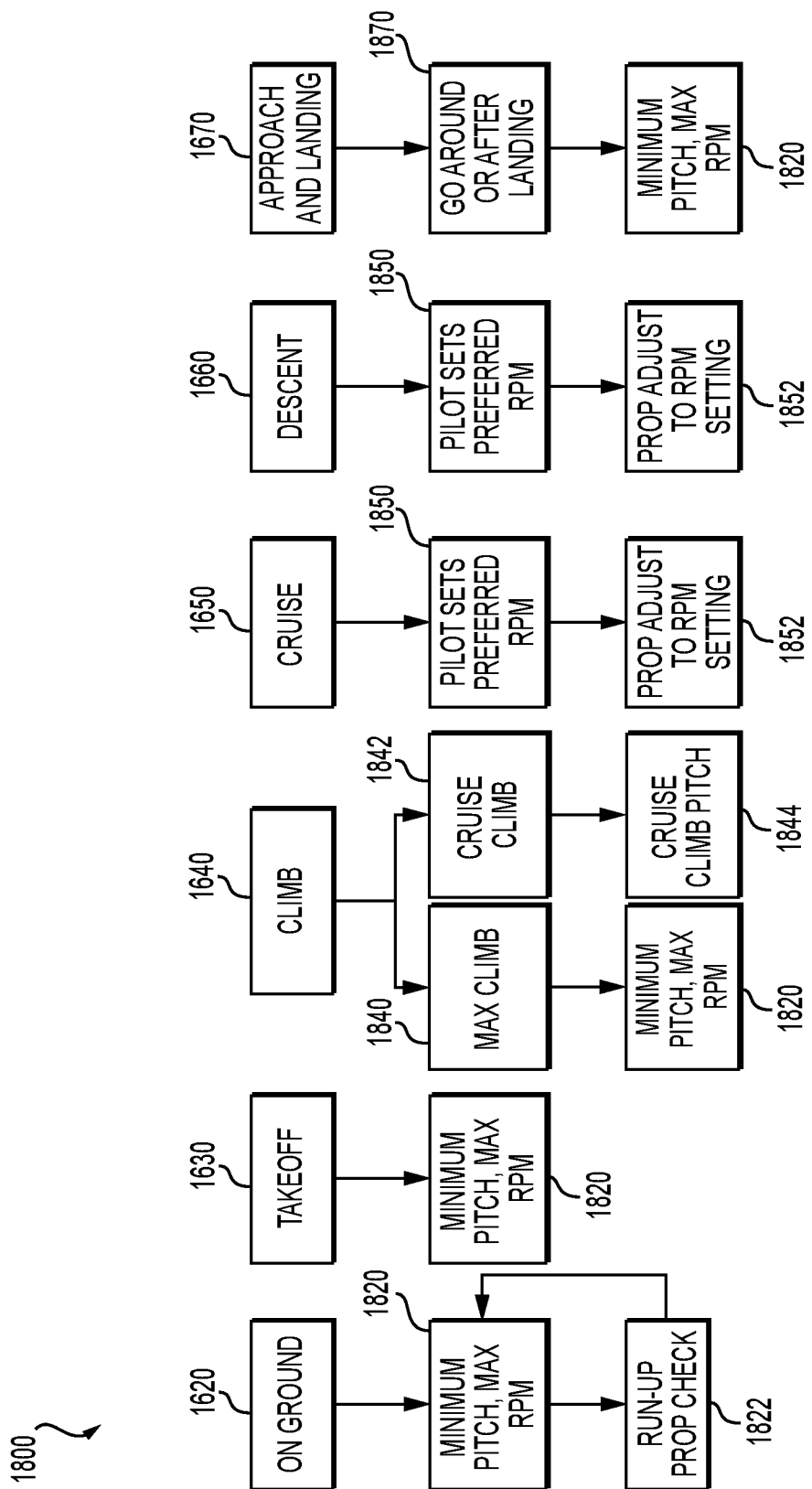
FIG. 18 is a flow diagram of an auto-propeller operational control, in an embodiment.
Figure 19:
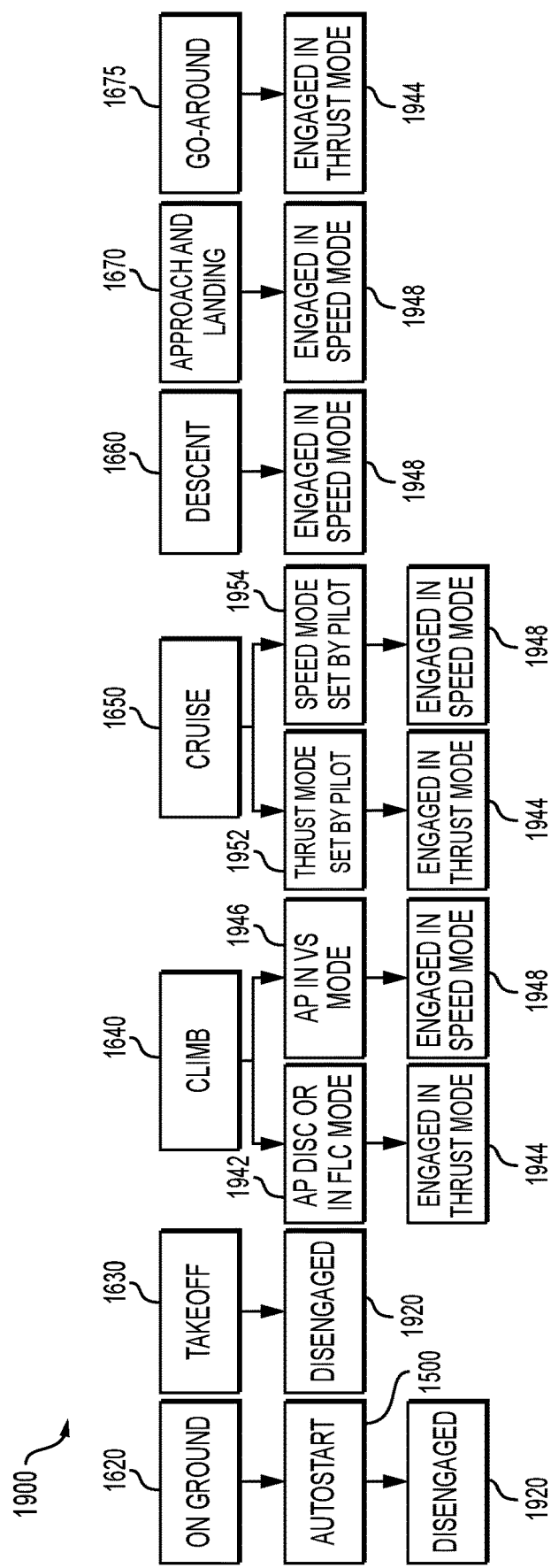
FIG. 19 is a flow diagram of an auto-throttle operational control, in an embodiment.

FIG. 16 is a flow diagram showing an exemplary flight-plan operational sequence 1600, which shows the different modes of aircraft operation. In FIGS. 17-19, settings for the auto-mixture control, auto-propeller control, and auto-throttle control are shown and described below based on the aircraft modes of operation shown in FIG. 16.

In a step 1610, the aircraft is in a startup mode. In an example of step 1610, the auto-start mode described in connection with FIGS. 15A and 15B may be in operation. Alternatively, a manual start mode may be employed.

In a step 1620, the aircraft is in a ground mode. In an example of step 1620, the aircraft engine is operating and the aircraft is either idling or taxiing.

In a step 1630, the aircraft is in takeoff mode. In an example of step 1630, the aircraft is taking off from a runway.

In a step 1640, the aircraft is in climb mode. In an example of step 1640, the aircraft has lifted off of the ground and is steadily climbing towards a cruise altitude.

In a step 1650, the aircraft is in a cruise mode. In an example of step 1650, the aircraft has achieved level-steady flight at a preferred cruise altitude.

In a step 1660, the aircraft is in a descent mode. In an example of step 1660, the aircraft is descending from its cruise altitude.

In a step 1670, the aircraft is in an approach/landing mode. In an example of step 1670, the aircraft is approaching a runway and touching down on the runway.

Transitions between the flight modes may proceed in various orders. For example, during flight the pilot may desire an altitude change to adjust the aircraft's altitude. For an altitude change 1645 to raise the altitude, the flight mode is switched from cruise mode in step 1650 back to climb mode in step 1640, and then returned to cruise mode. For an altitude change 1655 to lower the altitude, the flight mode may be switched from cruise mode in step 1650 to descent mode in step 1660, and then returned to cruise mode. When the aircraft is cruising at a relatively low altitude, the pilot may choose a direct transition to approach 1665, where the mode is changed directly from cruise mode in step 1650 to approach/landing mode in step 1670, rather than transitioning from a relatively high cruising altitude via descent mode 1660. If an approach/landing in step 1670 is to be aborted for a go-around 1675, the flight mode is returned to the climb mode in step 1640.

FIG. 17 is a flow diagram showing an exemplary auto-mixture control flight-plan 1700, which shows the auto-mixture control settings based on the different modes of aircraft operation shown in FIG. 16. The auto-mixture control settings are determined via a mixture controller, such as mixture control servo 146 described above in connection with FIGS. 5-7.

When the aircraft is in the ground mode 1620, the auto-mixture setting is set to full rich 1720.

During takeoff mode 1630 at a low altitude 1730, the auto-mixture setting is set to full rich 1720 or scheduled fuel flow as required by the airplane. For example, at a low altitude 1730 (e.g., from sea level to 4,999-ft), the auto-mixture setting is set to full rich 1720. In some aircraft, the mixture will be set based on engine fuel flow 1720. For higher altitude takeoff, the engine must be leaned to maintain full power output. During takeoff mode 1630 at a high altitude 1732, a high-altitude takeoff target fuel flow 1742 is set automatically. For example, at a takeoff altitude of 5,000-ft or higher, a high-altitude takeoff target fuel flow 1742 is set automatically.

When the aircraft is in climb mode 1640, a climb target fuel flow 1744 is set automatically. Climb target fuel flow 1744 during climb mode 1640 may reduce fuel flow for efficiency while maintaining enough "rich" fuel for cooling.

During cruise mode 1650, a cruise target fuel flow 1746 is initially set while cruise flight is established. For "fine" leaning of the air-fuel mixture, a lean to exhaust gas temperature (EGT) setpoint 1752 is used. For example, the fuel mixture is reduced to a predetermined EGT value relative to the peak EGT realized during the leaning procedure. The EGT setpoint may be established at rich of peak 1754, at peak 1756 or at lean of peak 1758.

When the aircraft is in descent mode 1660 at low altitude 1730, the auto-mixture setting is set to full rich or schedule based on the cruise EGT 1720. During descent mode 1660 at high altitude 1732, the auto-mixture setting is set based on the last cruise EGT 1762. For example, the fuel flow rate is either reduced or increased based on last cruise EGT.

During approach and landing 1670 at low altitude 1730, the auto-mixture setting is set to full rich or set based on an altitude schedule 1720. During approach and landing 1670 at high altitude 1732, the auto-mixture setting is set based on an altitude schedule 1772. For example, the fuel flow rate is either reduced or increased based on the aircraft's current altitude.

FIG. 18 is a flow diagram showing an exemplary auto-propeller control flight-plan 1800, which shows the auto-propeller control settings based on the different modes of aircraft operation shown in FIG. 16.

When the aircraft is in the ground mode 1620, the auto-propeller control is set to minimum pitch and maximum speed (RPM) 1820. In variants where an automated engine run-up is accomplished, the propeller check 1822 will exercise the propeller by reducing the control enough to realize a 200-RPM drop as propeller pitch increases, then return the propeller to the minimum pitch and maximum speed (RPM). Where an automated run-up check is not used, the propeller check 1822 will be accomplished manually by the pilot.

During takeoff mode 1630, the auto-propeller control is set to minimum pitch and maximum speed (RPM) 1820.

When the aircraft is in climb mode 1640 for a maximum climb 1840, the auto-propeller control is set to minimum pitch and maximum speed (RPM) 1820. For a cruise climb 1842, the auto-propeller control is set to a cruise climb pitch 1844 sufficient to obtain a specific engine RPM.

During cruise mode 1650 and the descent mode 1660, the pilot sets a preferred speed (RPM) 1850 (e.g., via a switch, knob, or digital input from avionics), and the propeller pitch is automatically adjusted 1852 to match the RPM setting.

Upon entering the approach and landing mode 1670, the pilot sets a preferred speed (RPM) 1850 (e.g., via a switch, knob, or digital input from avionics), and the propeller pitch is automatically adjusted 1852 to match the RPM setting. If the pilot selects go-around or completes the landing 1870, the auto-propeller control is set to minimum pitch and maximum speed (RPM) 1820. Other aspects of approach and landing may be used for auto-detection without departing from the scope hereof.

FIG. 19 is a flow diagram showing an exemplary auto-throttle control flight-plan 1900, which shows the auto-throttle control settings based on the different modes of aircraft operation shown in FIG. 16.

When the aircraft is in the ground mode 1620, for the auto-start sequence 1500, described above in connection with FIGS. 15A and 15B, the auto-throttle function is disengaged 1920. For example, the auto-throttle engages while the auto-start sequence 1500 is performed, then disengages at the completion of auto-start.

During takeoff mode 1630, the auto-throttle function is disengaged 1920. For takeoff, the auto-throttle is disengaged as a safety feature to prevent inadvertent reduction in thrust if a failure occurs within the auto-throttle system.

When the aircraft is in climb mode 1640, if the auto-pilot (AP) is disconnected, the pilot will adjust the aircraft pitch attitude to maintain airspeed with the engine at a constant thrust setting (e.g., climb thrust mode 1944). If auto-pilot is operating in Flight-Level Change (FLC) mode 1942, then the auto-throttle is engaged in climb thrust mode 1944. For example, in climb thrust mode 1944, throttle changes initiated by the auto-throttle via power control lever 111 are modified to achieve and maintain a specific engine thrust (or power). Otherwise, if the autopilot is in vertical speed (VS)

mode 1946, then the auto-throttle is engaged in speed mode 1948. For example, in speed mode 1948, throttle changes initiated by the auto-throttle via power control lever 111 are modified to achieve and maintain a specific aircraft speed.

During cruise mode 1650, when the thrust mode is set by the pilot 1952, then the auto-throttle is engaged in thrust mode 1944. Otherwise, when the speed mode is set by the pilot 1954, then the auto-throttle is engaged in speed mode 1948.

When the aircraft is in descent mode 1660, the auto-throttle is engaged in speed mode 1948.

During approach and landing 1670, the auto-throttle is engaged in speed mode 1948.

If a go-around 1675 is employed, then the auto-throttle is engaged in thrust mode 1944.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An automatic aircraft powerplant control system, comprising:
   a throttle control configuration for controlling a throttle, comprising:
     a throttle servo mechanically coupled with an engine via a throttle control linkage, wherein the throttle servo is configured for adjusting a throttle valve via the throttle control linkage;
     a throttle control lever communicatively coupled with the throttle servo for providing a user input to the throttle servo; and
     a throttle controller communicatively coupled with the throttle servo for controlling the throttle servo, wherein the throttle controller receives inputs from an avionics bus, and the throttle controller is configured to control the throttle servo for adjusting the throttle valve based at least partially on the inputs;
   a propeller control configuration for controlling a propeller, comprising:
     a propeller servo mechanically coupled with the engine via a propeller control linkage, wherein the propeller servo is configured for adjusting a propeller governor setting of the engine;
     a propeller control lever communicatively coupled with the propeller servo for providing a user input to the propeller servo; and
     a propeller controller communicatively coupled with the propeller servo for controlling the propeller servo; and
   a mixture control configuration for controlling an air-fuel mixture, comprising:
     a mixture control servo mechanically coupled with the engine via a mixture control linkage, wherein the mixture control servo is configured for providing a mixture control output to the engine via the mixture control linkage for adjusting the air-fuel mixture; and
     a mixture controller communicatively coupled with the mixture control servo for controlling the mixture control servo.

2. The system of claim 1, further comprising a mixture control lever configured to provide a mechanical over-ride of the linkage for controlling the air-fuel mixture in the event of a malfunction of the mixture control servo.

3. The system of claim 1, wherein the throttle servo comprises a single servo configured to back drive the throttle control lever for controlling the throttle valve.

4. The system of claim 1, wherein the propeller servo adjusts the propeller governor setting of the engine to change a propeller pitch, based on the user input from the propeller control lever and the inputs received from the avionics bus, thereby adjusting a propeller speed for a given power output from the engine.

5. The system of claim 1, further comprising a mechanical mixer that mechanically mixes an input received from a servo with an input received from a manual control lever to provide proper control at the engine, including an ability to back-drive the manual control lever when the servo is active.

6. The system of claim 5, wherein the mechanical mixer is installed in an engine compartment.

7. The system of claim 5, wherein the mechanical mixer is mounted externally to the engine.

8. The system of claim 1, further comprising a back-up electro-mechanical advance, wherein the back-up electro-mechanical advance comprises a solenoid configured to force the propeller to a high-speed state via the propeller control linkage.

9. The system of claim 8, further comprising an emergency advance switch electronically coupled with the solenoid for enabling a user to select a high-speed state of the propeller for a remainder of a flight.

10. The system of claim 8, wherein the back-up electro-mechanical advance lacks a mechanical link to the throttle control lever.

11. The system of claim 8, wherein the solenoid is configured to change a mechanical scheduling of the propeller via the propeller control linkage.

12. The system of claim 11, further comprising a propeller-speed switch communicatively coupled with the solenoid, wherein the propeller-speed switch is configured to receive a user input for switching between a low-speed setting and a high-speed setting of the propeller.

13. The system of claim 1, further comprising a mixture control lever communicatively coupled with the mixture control servo for providing a user input to the mixture control servo.

14. The system of claim 13, wherein the mixture control servo comprises a single servo having a back-drive capability configured to back drive the mixture control lever for adjusting the air-fuel mixture.

15. The system of claim 14, wherein the back-drive capability is configured to be disengaged via a user input thereby allowing manual control of the air-fuel mixture via the mixture control lever mechanically coupled with the mixture control linkage.

16. The system of claim 1, further comprising:
   a mixture full-override device; and
   a max-mixture switch, wherein the max-mixture switch is configured to receive a user input for activating the mixture full-override device to override the mixture control servo thereby providing a full-rich mixture to the engine for a remainder of a flight.

17. An automatic aircraft powerplant control system, comprising:
- a throttle control configuration for controlling a throttle, comprising:
  - a throttle servo mechanically coupled with an engine via a throttle control linkage, wherein the throttle servo is configured for adjusting a throttle valve via the throttle control linkage;
  - a throttle control lever communicatively coupled with the throttle servo for providing a user input to the throttle servo; and
  - a throttle controller communicatively coupled with the throttle servo for controlling the throttle servo;
- a propeller control configuration for controlling a propeller, comprising:
  - a propeller servo mechanically coupled with the engine via a propeller control linkage, wherein the propeller servo is configured for adjusting a propeller governor setting of the engine;
  - a propeller control lever communicatively coupled with the propeller servo for providing a user input to the propeller servo; and
  - a propeller controller communicatively coupled with the propeller servo for controlling the propeller servo, wherein the propeller controller receives inputs from an avionics bus, and the propeller controller is configured to control the propeller servo for adjusting the propeller governor setting based at least partially on the inputs; and
- a mixture control configuration for controlling an air-fuel mixture, comprising:
  - a mixture control servo mechanically coupled with the engine via a mixture control linkage, wherein the mixture control servo is configured for providing a mixture control output to the engine via the mixture control linkage for adjusting the air-fuel mixture; and
  - a mixture controller communicatively coupled with the mixture control servo for controlling the mixture control servo.

18. An automatic aircraft powerplant control system, comprising:
- a throttle control configuration for controlling a throttle, comprising:
  - a throttle servo mechanically coupled with an engine via a throttle control linkage, wherein the throttle servo is configured for adjusting a throttle valve via the throttle control linkage;
  - a throttle control lever communicatively coupled with the throttle servo for providing a user input to the throttle servo; and
  - a throttle controller communicatively coupled with the throttle servo for controlling the throttle servo;
- a propeller control configuration for controlling a propeller, comprising:
  - a propeller servo mechanically coupled with the engine via a propeller control linkage, wherein the propeller servo is configured for adjusting a propeller governor setting of the engine;
  - a propeller control lever communicatively coupled with the propeller servo for providing a user input to the propeller servo; and
  - a propeller controller communicatively coupled with the propeller servo for controlling the propeller servo; and
- a mixture control configuration for controlling an air-fuel mixture, comprising:
  - a mixture control servo mechanically coupled with the engine via a mixture control linkage, wherein the mixture control servo is configured for providing a mixture control output to the engine via the mixture control linkage for adjusting the air-fuel mixture; and
  - a mixture controller communicatively coupled with the mixture control servo for controlling the mixture control servo, wherein the mixture controller receives inputs from an avionics bus, and the mixture controller is configured to control the mixture control servo for controlling the air-fuel mixture based at least partially on the inputs.

19. The system of claim 18, further comprising:
a boost solenoid communicatively coupled with the avionics bus, wherein the boost solenoid is configured to provide a maximum mixture setting for emergency or back-up operations.

* * * * *